(12) United States Patent
Iwasa et al.

(10) Patent No.: US 10,472,108 B2
(45) Date of Patent: Nov. 12, 2019

(54) BOX-OPENING DEVICE

(71) Applicant: ISHIDA CO., LTD., Kyoto-shi, Kyoto (JP)

(72) Inventors: Tatsuya Iwasa, Ritto (JP); Atsushi Takahashi, Ritto (JP); Yuji Yokota, Ritto (JP); Takeshi Noguchi, Ritto (JP); Tatsuya Arimatsu, Ritto (JP); Hiroshi Okano, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 0 days.

(21) Appl. No.: 16/072,494

(22) PCT Filed: Dec. 7, 2016

(86) PCT No.: PCT/JP2016/086327
§ 371 (c)(1),
(2) Date: Jul. 24, 2018

(87) PCT Pub. No.: WO2017/130575
PCT Pub. Date: Aug. 3, 2017

(65) Prior Publication Data
US 2019/0061982 A1 Feb. 28, 2019

(30) Foreign Application Priority Data
Jan. 25, 2016 (JP) ................ 2016-011862

(51) Int. Cl.
*B65B 43/30* (2006.01)
*B31B 50/80* (2017.01)
(Continued)

(52) U.S. Cl.
CPC .......... *B65B 43/305* (2013.01); *B31B 50/804* (2017.08); *B65B 43/30* (2013.01);
(Continued)

(58) Field of Classification Search
CPC ..... B65B 43/30; B65B 43/305; B65B 43/325; B65B 43/265; B65B 43/285; B31B 50/80;
(Continued)

(56) References Cited

U.S. PATENT DOCUMENTS 3,740,919 A * 6/1973 Heisler ............... B65B 5/08
53/376.5
4,057,008 A * 11/1977 Hughes ............... B31B 50/00
493/310
(Continued)

FOREIGN PATENT DOCUMENTS

DE 2323644 A1 11/1974
EP 0693425 A2 1/1996
(Continued)

OTHER PUBLICATIONS

The Search Report from the corresponding European Patent Application No. 16888159.7 dated Dec. 14, 2018 [No. of pages (6)].
(Continued)

*Primary Examiner* — Robert F Long
*Assistant Examiner* — Eduardo R Ferrero
(74) *Attorney, Agent, or Firm* — Shinjyu Global IP

(57) ABSTRACT

Provided is a highly reliable box-opening device being capable of suppressing failures of a box-opening action regardless of a size of a cardboard box sheet. The box-opening device unfolds a sheet in which first and second side surfaces and third and fourth side surfaces overlap, and forms a square-tube-shaped cardboard box. The box-opening device may have a suction disk to grasp the first side surface, a main arm having suction disks to grasp the fourth side surface and changing a posture while grasping the fourth side surface, and a control part to control a movement of the main arm so that an initial action, in which a gap is formed between the first and second side surfaces and the
(Continued)

third and fourth side surfaces, and a main action that follows the initial action, are executed as an action of unfolding the sheet.

9 Claims, 13 Drawing Sheets

(51) Int. Cl.
  *B25J 15/06* (2006.01)
  *B65G 47/91* (2006.01)
  *B65H 3/08* (2006.01)
(52) U.S. Cl.
  CPC ............ *B25J 15/0616* (2013.01); *B65G 47/91* (2013.01); *B65H 3/0808* (2013.01)
(58) Field of Classification Search
  CPC .. B31B 50/802; B31B 50/804; B25J 15/0616; B65G 47/91; B65H 3/0808
  USPC .............................. 53/564; 493/313, 316, 317
  See application file for complete search history.

(56) References Cited

U.S. PATENT DOCUMENTS

| | | | | |
|---|---|---|---|---|
| 4,197,790 A * | 4/1980 | Dietrich | ................ | B31B 50/00 493/313 |
| 4,348,853 A * | 9/1982 | Morse | ................ | B65B 43/205 493/122 |
| 4,441,377 A * | 4/1984 | Nowacki | ................ | B31B 50/00 74/105 |
| 4,493,687 A * | 1/1985 | Bernle | ................ | B65B 43/285 493/310 |
| 4,629,446 A | 12/1986 | Focke | | |
| 4,871,348 A * | 10/1989 | Konaka | ................ | B65B 43/185 493/315 |
| 4,892,513 A * | 1/1990 | Kwiek | ................ | B31B 50/80 493/316 |
| 5,061,231 A * | 10/1991 | Dietrich | ................ | B65B 43/185 271/95 |
| 5,067,937 A * | 11/1991 | Aschaber | ................ | B31B 50/80 493/310 |
| 5,186,706 A * | 2/1993 | Hartness | ................ | B31B 50/00 414/795.8 |
| 5,473,868 A * | 12/1995 | Antonio | ................ | B65B 43/345 493/309 |
| 5,813,965 A * | 9/1998 | Mitchell | ................ | B31B 50/80 493/315 |
| 5,860,269 A * | 1/1999 | Takahashi | .............. | B65H 1/025 414/795.5 |
| 6,311,457 B1 * | 11/2001 | May | ...................... | B65B 43/185 271/108 |
| 2015/0232217 A1 * | 8/2015 | Yokota | .................... | B65B 43/54 414/222.01 |
| 2015/0298842 A1 * | 10/2015 | Yokota | .................... | B65B 43/54 53/458 |
| 2016/0332761 A1 * | 11/2016 | Yokota | ................ | B65B 43/265 |
| 2017/0341790 A1 * | 11/2017 | Yokota | .................... | B65B 43/54 |

FOREIGN PATENT DOCUMENTS

| | | |
|---|---|---|
| JP | S52-099193 A | 8/1977 |
| JP | H02-139227 A | 5/1990 |
| JP | H07-241938 A | 9/1995 |
| JP | H07-241939 A | 9/1995 |
| JP | 2014-061635 A | 4/2014 |

OTHER PUBLICATIONS

The Search Report from the corresponding International Patent Application No. PCT/JP2016/086327 dated Mar. 7, 2017.
The Preliminary Report on Patentability (with Written Opinion) from the corresponding International Patent Application No. PCT/JP2016/086327 dated Jul. 31, 2018.

* cited by examiner

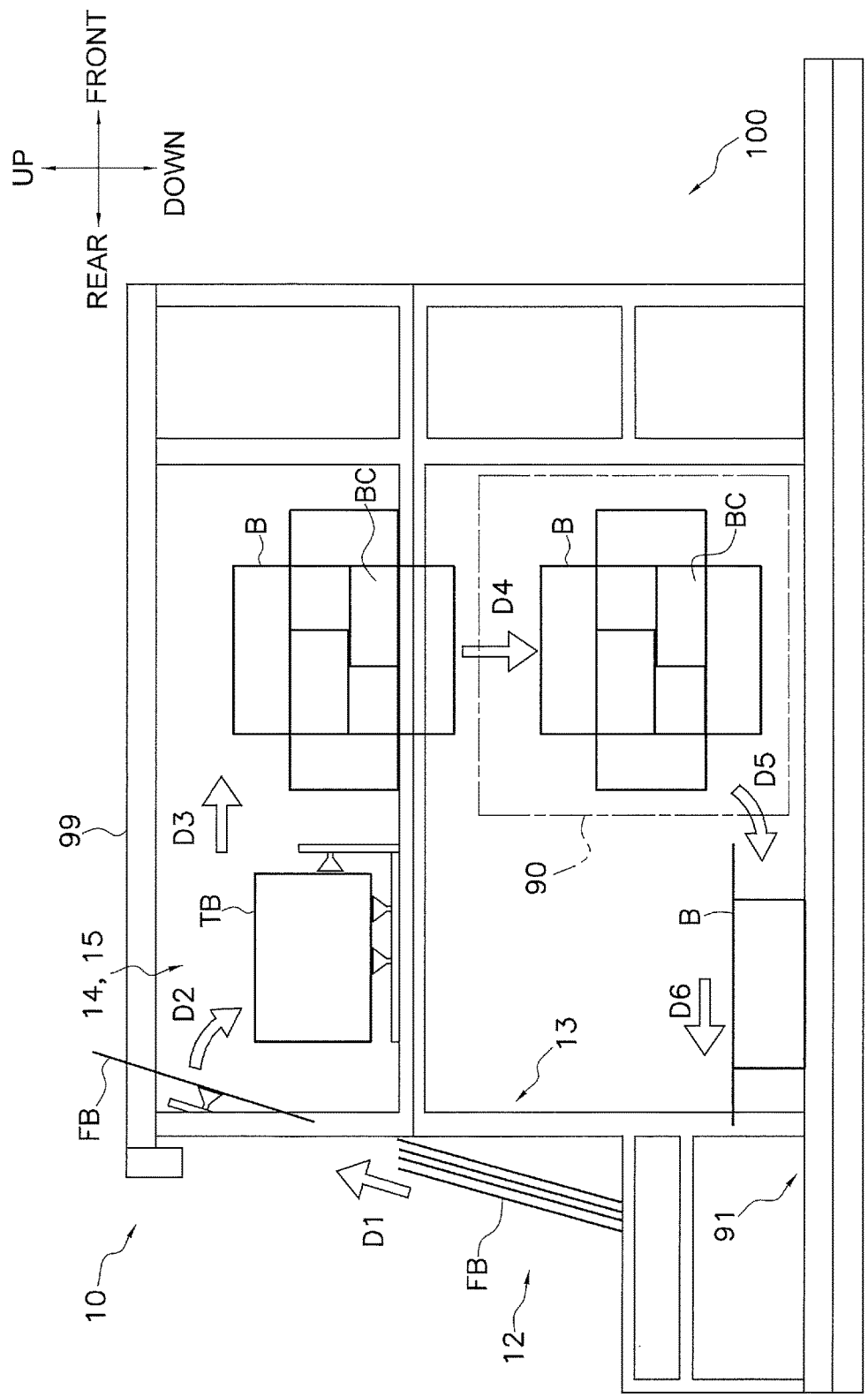
F I G. 1

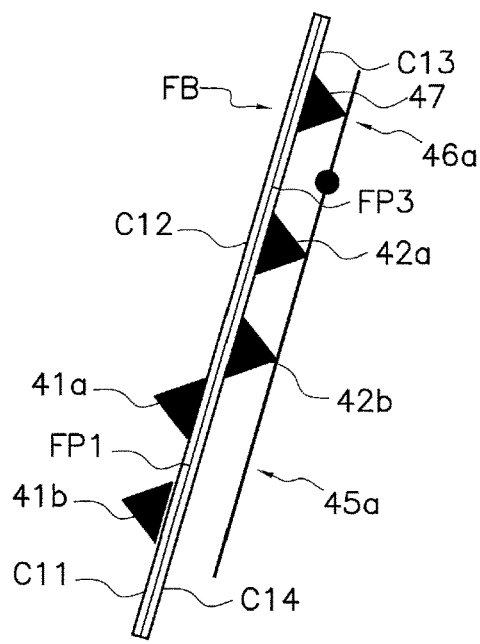
F I G. 6 A
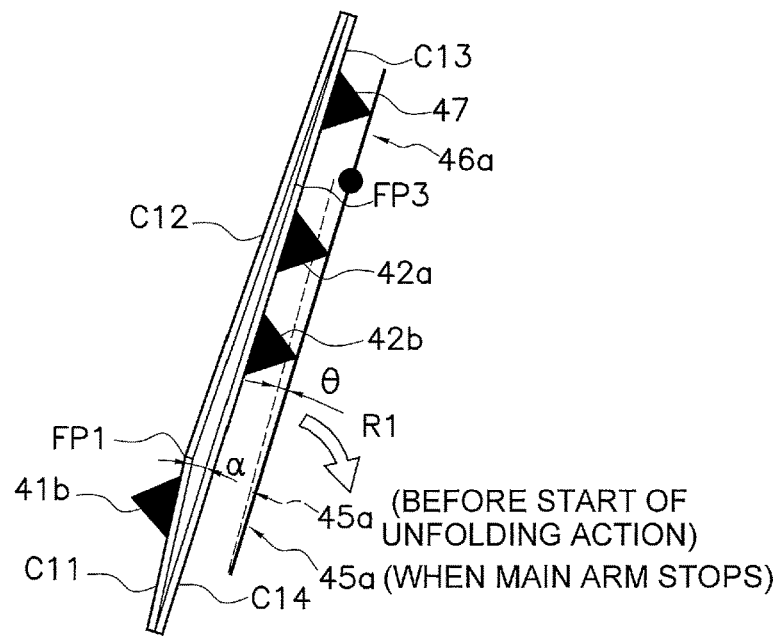
F I G. 6 B

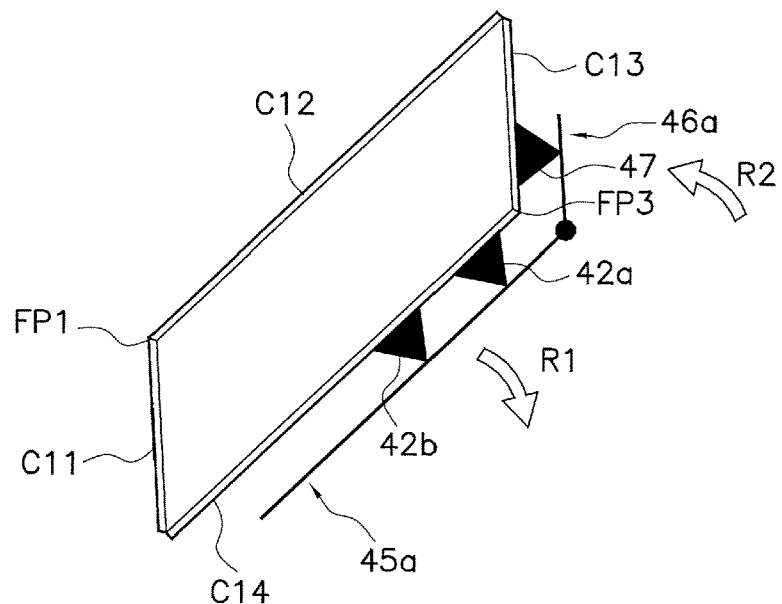
F I G. 6 E
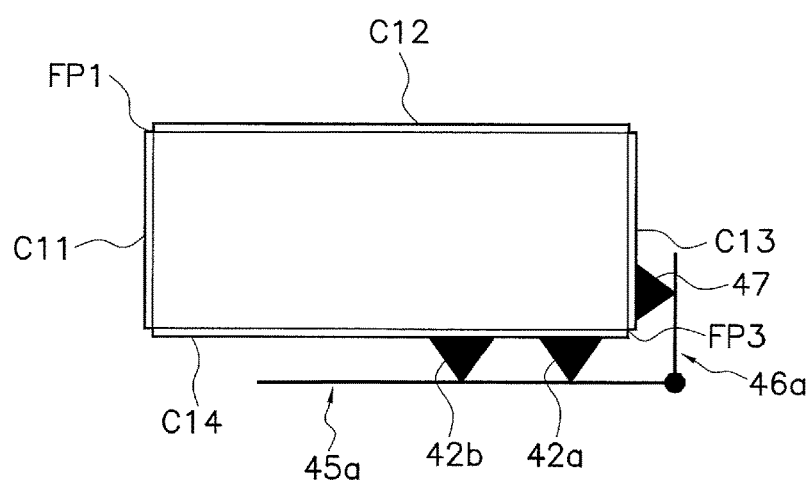
F I G. 6 F

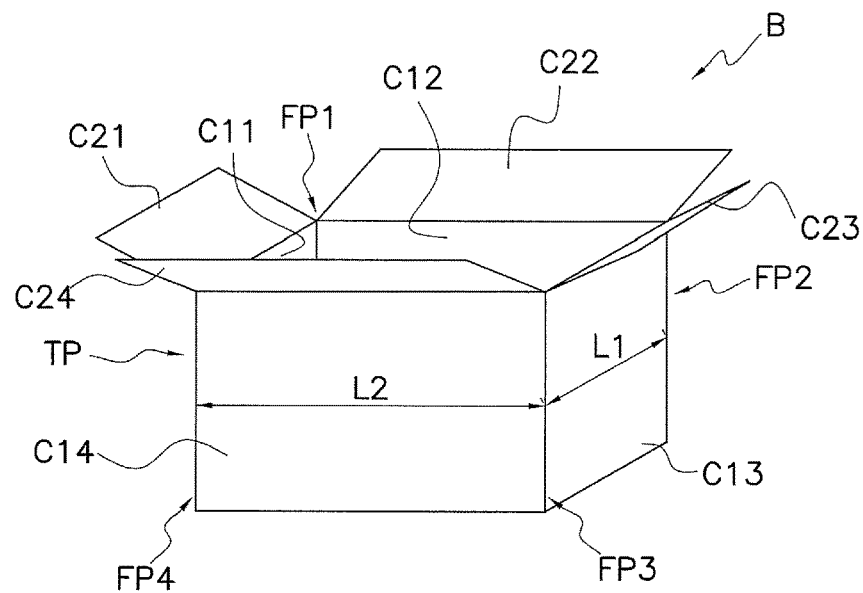
F I G. 7 A
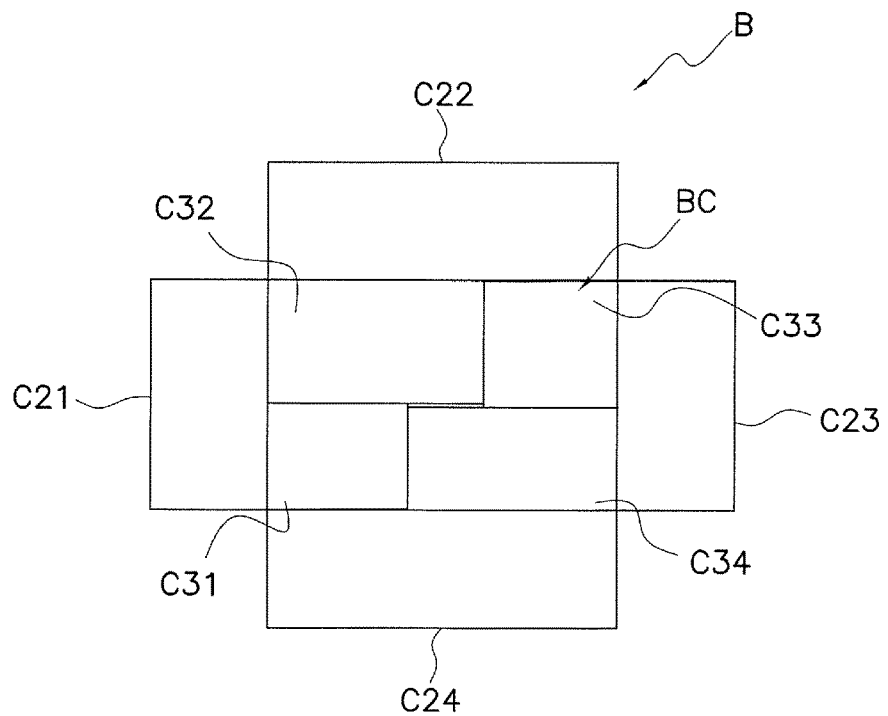
F I G. 7 B

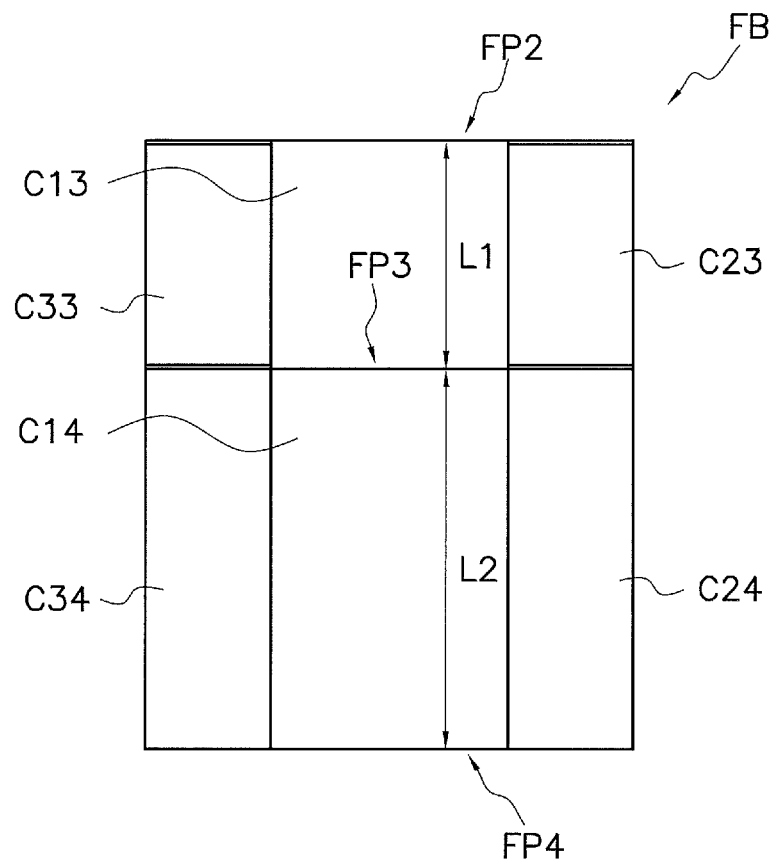
F I G. 8 A

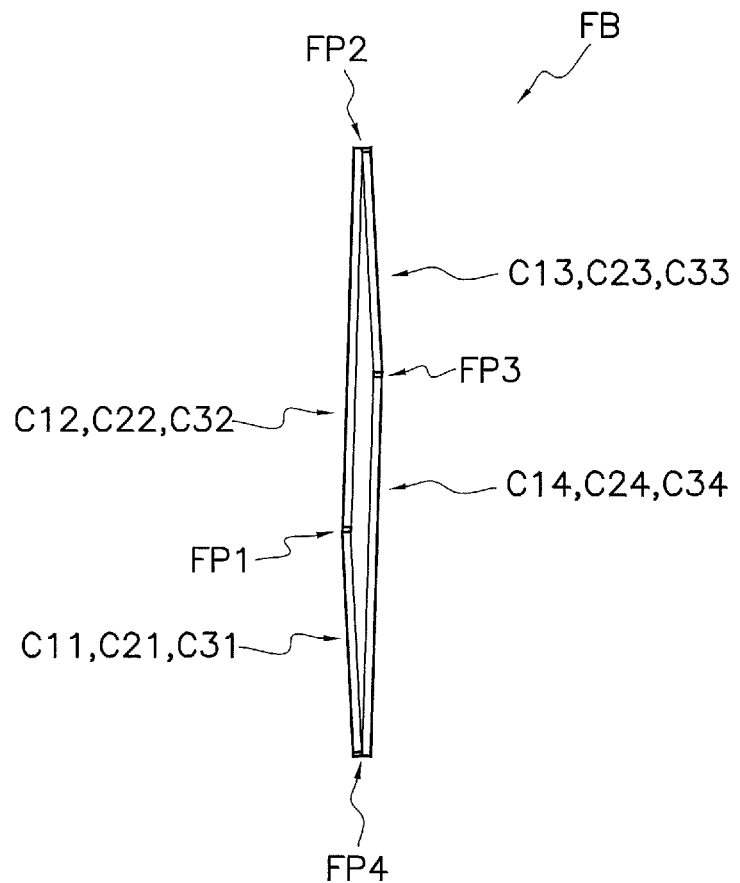
F I G. 8 B

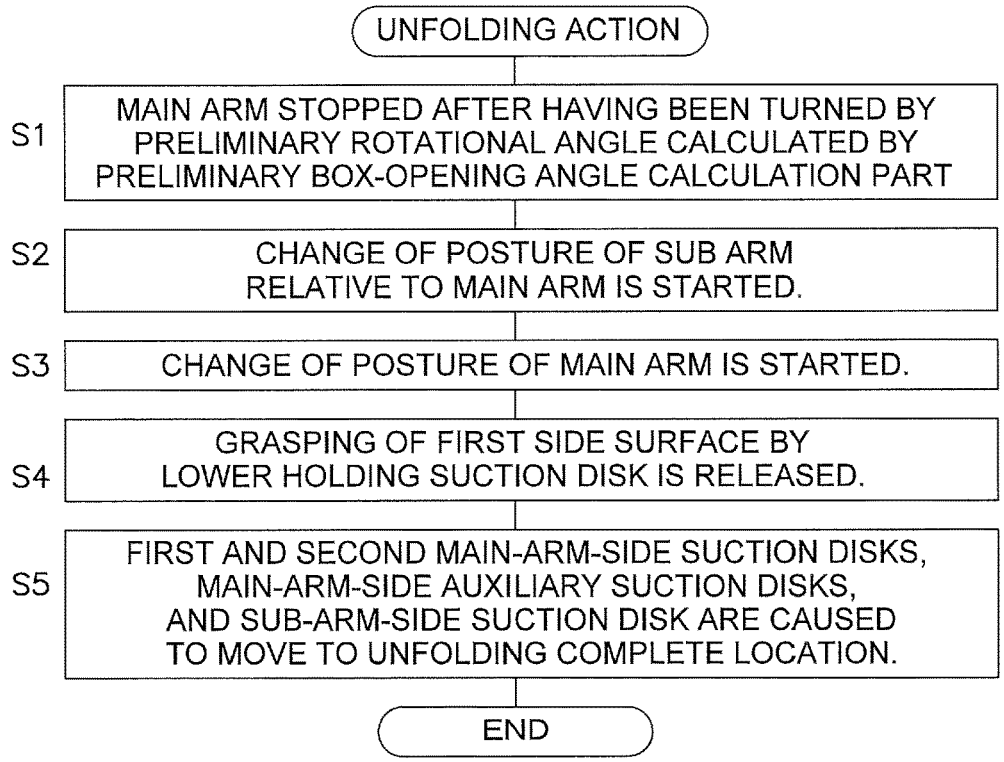
F I G. 9
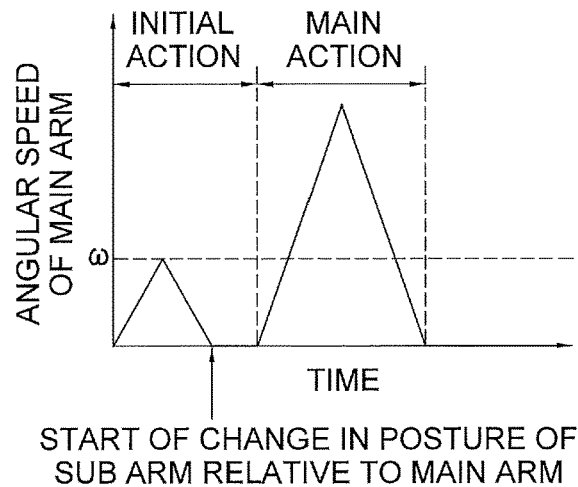
F I G. 10 A

BOX-OPENING DEVICE

PRIORITY

This is a National Stage Application under 35 U.S.C. § 365 of International Application PCT/JP2016/086327, with an international filing date of Dec. 7, 2016, which claims priority to Japanese Patent Application No. 2016-011862 filed on Jan. 25, 2016. The entire disclosures of International Application PCT/JP2016/086327 and Japanese Patent Application No. 2016-011862 are hereby incorporated herein by reference.

TECHNICAL FIELD

Certain implementations of the present invention relate to a box-opening device, and particularly relate to a box-opening device configured to unfold a cardboard box sheet that had been folded and to form the sheet into a square-tube-shaped cardboard box.

BACKGROUND ART

There are known box-opening devices configured to unfold a cardboard box sheet which had been folded and in which a first and a second side surfaces and a third and a fourth side surfaces overlap, and to form a square-tube-shaped cardboard box. The first side surface, the second side surface, the third side surface, and the fourth side surface are arranged in this order and constitute four surfaces of the square-tube-shaped cardboard box.

SUMMARY

In certain box-opening devices, the predetermined location, to which the arm is moved at the completion of the initial action, is always the same. Therefore, the inventors of the present application have discovered that, depending on a size of the cardboard box sheet being used, there is a risk of failure in the box-opening action, such as deformation or damage of the cardboard box sheet caused by unreasonable force and unintentional release of grasping of the side surfaces by the grasping parts due to an excessive force acting thereon, when a box is opened.

An object of certain embodiments of the present invention is to provide a box-opening device configured to unfold a cardboard box sheet that had been folded and to form a square-tube-shaped cardboard box, which is capable of suppressing the occurrences of failures of the box-opening action regardless of the size of the cardboard box sheet and thereby highly reliable.

A box-opening device according to a first aspect of the present invention unfolds a cardboard box sheet which had been folded and in which a first and a second side surfaces and a third and a fourth side surfaces overlap, and forms a square-tube-shaped cardboard box in which the first side surface, the second side surface, the third side surface, and the fourth side surface are arranged in this order. The box-opening device is provided with a first grasping part, a first arm, and a control part. The first grasping part grasps the first side surface. The first arm has a second grasping part which grasps the fourth side surface. The first arm changes a posture while the second grasping part grasping the fourth side surface. The control part controls a movement of the first arm so that an initial action and a main action performed after the initial action are executed as an action of unfolding the cardboard box sheet. In the initial action, a gap is formed between the first and second side surfaces and the third and fourth side surfaces of the folded cardboard box sheet overlapping each other. In the main action, the cardboard box sheet is formed into a square tube shape. The first arm moves at or slower than a predetermined speed in the initial action, and the first arm moves faster than the predetermined speed in the main action. The control part controls the movement of the first arm based on an angle formed by the first side surface and the fourth side surface at completion of the initial action, the angle being determined according to a size of the cardboard box sheet.

In the box-opening device according to the first aspect of the present invention, the movement of the first arm is controlled based on an angle formed by the first side surface and the fourth side surface at the completion of the initial action and the angle is determined according to the size of the cardboard box sheet. Therefore, during the main action, in which the first arm is moved at a comparatively high speed while the fourth side surface is being grasped, it is possible to reduce the possibility that unreasonable force acts on the cardboard box sheet or excessive force acts on the grasping parts. As a result, it is possible to achieve a highly reliably box-opening device in which occurrences of failure of the box-opening action can be suppressed.

A box-opening device according to a second aspect of the present invention is the box-opening device according to the first aspect, wherein the angle formed by the first side surface and the fourth side surface at the completion of the initial action is determined according to a length of the fourth side surface of the cardboard box sheet.

In this aspect, the term "length of the fourth side surface" means the distance from the border between the third side surface and the fourth side surface to the border between the fourth side surface and the first side surface.

In the box-opening device according to the second aspect of the present invention, because the angle formed by the first side surface and the fourth side surface at the completion of the initial action is determined according to the length of the fourth side surface, it is possible, during the main action, to reduce the possibility that unreasonable force acts on the cardboard box sheet or excessive force acts on the grasping parts, and occurrences of failures of the box-opening action can therefore be suppressed.

A box-opening device according to a third aspect of the present invention is the box-opening device according to the second aspect, wherein the angle formed by the first side surface and the fourth side surface at the completion of the initial action is determined to be a value that is greater as the length of the fourth side surface is greater.

In the box-opening device according to the third aspect of the present invention, because the angle formed by the first side surface and the fourth side surface at the completion of the initial action is determined to be a value that is greater as the length of the fourth side surface is greater, it is possible, during the main action, to reduce a possibility that unreasonable force acts on the cardboard box sheet or excessive force acts on the grasping parts, and occurrences of failures of the box-opening action can therefore be suppressed.

A box-opening device according to a fourth aspect of the present invention is the box-opening device according to any of the first through third aspects, is further provided with a second arm. The second arm has a third grasping part to grasp the third side surface. The second arm changes a posture while the third grasping part grasps the third side surface. The control part further controls a movement of the second arm.

Because the box-opening device according to the fourth aspect of the present invention further has the second arm that changes the posture while the third side surface is grasped, the shape of the cardboard box sheet during unfolding can be made to approximate a shape that is not likely to be subjected to excessive force. Therefore, in the box-opening device according to the fourth aspect of the present invention, it is easy to suppress occurrences of failures of the box-opening action.

A box-opening device according to a fifth aspect of the present invention is the box-opening device according to the fourth aspect, wherein the second arm is linked to the first arm so as to be able to change a posture relative to the first arm. During the main action, the control part moves the first arm while causing the second arm to change the posture relative to the first arm.

In the box-opening device according to the fifth aspect of the present invention, because the posture of the second arm is changed relative to the first arm during the main action, it is easy during the main action to cause the shape of the cardboard box sheet during unfolding to approximate a shape that is not likely to be subjected to excessive force. Therefore, it is even easier to suppress occurrences of failures of the box-opening action.

A box-opening device according to a sixth aspect of the present invention is the box-opening device according to the fifth aspect, wherein at the start of the initial action, the control part moves the first arm without causing the posture of the second arm to change relative to the first arm. Before the end of the initial action, the control part causes the first arm to stop and the posture of the second arm to change relative to the first arm.

In the box-opening device according to the sixth aspect of the present invention, because the posture of the second arm is changed relative to the first arm while the first arm is stopped in the initial action (before the start of the main action), it is particularly unlikely for unreasonable force to act on the cardboard box sheet during the main action. Therefore, it is even easier to suppress occurrences of failures of the box-opening action.

A box-opening device according to a seventh aspect of the present invention is the box-opening device according to any of the fourth through sixth aspects, wherein at the end of the initial action, the control part controls the movement of the second arm so that the first side surface and the third side surface become parallel to each other and the second side surface and the fourth side surface become parallel to each other.

In the box-opening device according to the seventh aspect of the present invention, because the shape of the cardboard box sheet is made to a shape not likely to be subjected to excessive force at the completion of the initial action, it is even easier to suppress occurrences of failures of the box-opening action.

A box-opening device according to an eighth aspect of the present invention is the box-opening device according to any of the fourth through seventh aspects, wherein the second arm is driven by an air cylinder.

In the box-opening device according to the eighth aspect of the present invention, because driving of the second arm can be achieved with a comparatively inexpensive air cylinder, equipment costs can be suppressed.

A box-opening device according to a ninth aspect of the present invention is the box-opening device according to any of the first through eighth aspects, wherein the first grasping part releases the grasping of the first side surface after the start of the main action and before the end of the main action.

In the box-opening device according to the ninth aspect of the present invention, because the first grasping part and the second grasping part do not always pull the cardboard box sheet in opposite directions, excessive force is not likely to act on the cardboard box sheet, and it is even easier to suppress occurrences of failure of the box-opening action.

In certain implementations of the box-opening device, the movement of the first arm is controlled based on an angle formed by the first side surface and the fourth side surface at the completion of the initial action and the angle is determined according to the size of the cardboard box sheet. Therefore, during the main action, in which the first arm is moved at a comparatively high speed while the fourth side surface is being grasped, it is possible to reduce the possibility that unreasonable force acts on the cardboard box sheet or excessive force acts on the grasping parts. As a result, it is possible to achieve a highly reliably box-opening device in which occurrences of failure of the box-opening action can be suppressed.

BRIEF DESCRIPTION OF THE DRAWINGS

FIG. 1 is a schematic front view of a box-making and box-packing system having a box-opening device;

FIG. 6A is a drawing for illustrating the unfolding action of the cardboard box sheet in the box-opening section of FIG. 3 and depicts a state before the unfolding action is started;

FIG. 6B is a drawing for illustrating the unfolding action of the cardboard box sheet in the box-opening section of FIG. 3 and depicts a state at the moment the movement of the main arm is stopped in the initial action;

FIG. 6E is a drawing for illustrating the unfolding action of the cardboard box sheet in the box-opening section of FIG. 3 and depicts a state in which the first arm is moved while the second arm is caused to change posture relative to the first arm in the main action and a state in which grasping of the first side surface of the cardboard box sheet by a lower suction disk has been released;

FIG. 6F is a drawing for illustrating the unfolding action of the cardboard box sheet in the box-opening section of FIG. 3 and depicts a state in which the unfolding action (the main action) has completed;

FIG. 7A is a perspective view of a cardboard box which is unfolded by the box-opening section of FIG. 3 and a bottom cover thereof is then formed;

FIG. 7B is a bottom view of a cardboard box which is unfolded by the box-opening section of FIG. 3 and a bottom cover thereof is then formed;

FIG. 8A is a drawing, as seen from the side where the third side surface and the fourth side surface are present, of a cardboard box sheet which is unfolded by the box-opening section of FIG. 3 and is raised upright with a fourth folding portion at the bottom;

FIG. 8B is a drawing, as seen from the side (the side of an opening where a bottom-cover-side flap is disposed), of a cardboard box sheet which is unfolded by the box-opening section of FIG. 3 and is raised upright with the fourth folding portion at the bottom, and this drawing depicting, for the sake of making the drawing easier to view, a state in which the inner surface of the cardboard box on the side with the first and second side surfaces and the inner surface of the cardboard box on the side with the third and fourth side surfaces are separated rather than in contact;

FIG. 9 is a flowchart of the unfolding action of the cardboard box sheet by the box-opening section of FIG. 3;

FIG. 10A is a drawing showing an example of the change in angular speed of the main arm in the unfolding action of the cardboard box sheet by the box-opening section of FIG. 3;

DETAILED DESCRIPTION

A box-opening device according to one embodiment of the present invention is described with reference to the drawings. The following embodiment is one example of the present invention and is not intended to limit the technical range of the present invention.

In the following description, the expressions "up," "down," "front (front surface)," "rear (back surface)," "left," "right," etc., may be used; the directions referred to by these expressions correspond to the directions of the arrows shown in FIGS. 1 and 2 unless stated otherwise. The term "conveying direction" may also be used in the following description; the conveying direction herein means, unless stated otherwise, a direction in which a folded cardboard box sheet FB or cardboard B is transported in a box-making and box-packing system 100. The terms "upstream" and "downstream" may also be used in the following description; upstream/downstream herein means upstream/downstream in the conveying direction unless stated otherwise.

In the following description, the expressions "parallel," "orthogonal," "horizontal," "perpendicular," etc., may be used; these expressions do not mean only cases of a relationship of being parallel, orthogonal, horizontal, perpendicular, etc., in the strict sense of the word. The expressions "parallel," "orthogonal," "horizontal," "perpendicular," etc., include cases of a relationship of being substantially parallel, orthogonal, horizontal, perpendicular, etc.

(1) Overall General Configuration

Figure 5:
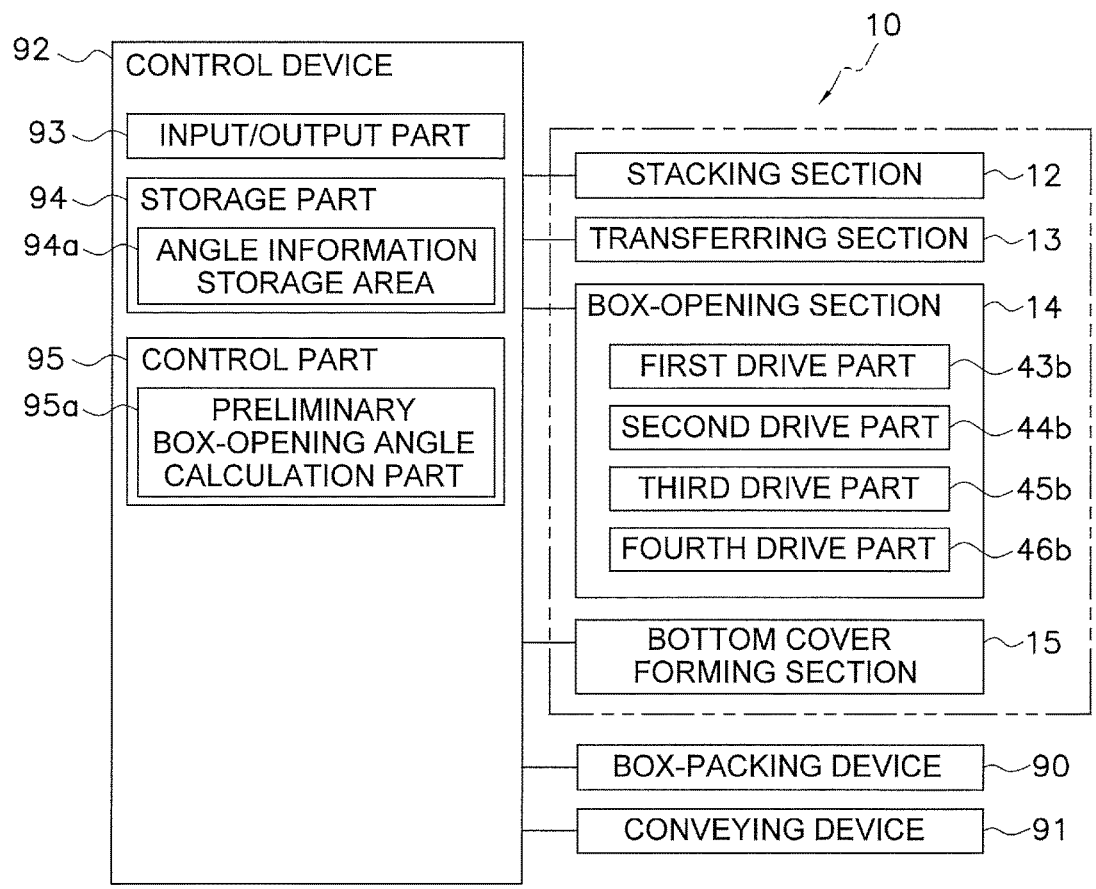
FIG. 5 is a block diagram of the box-making and box-packing system of FIG. 1.

FIG. 1 is a schematic side view (right side view) of the box-making and box-packing system 100 including a box-opening device according to an embodiment of the present invention. FIG. 5 is a block diagram of the box-making and box-packing system 100. In the present embodiment, the box-opening device is configured from a box-opening section 14 of a box-making sub-system 10 (described hereinafter) and a control device 92 (see FIGS. 1 and 3).

The box-making and box-packing system 100 is a system for forming a cardboard box B for packing articles, and packing the articles into the formed cardboard box B.

The box-making and box-packing system 100 unfolds a planar cardboard box sheet FB such as that shown in FIGS. 8A and 8B, and forms a square-tube-shaped cardboard box TB. The box-making and box-packing system 100 forms a bottom cover BC in the square-tube-shaped cardboard box TB and forms a cardboard box B such as that shown in FIG. 7A. The box-making and box-packing system 100 packs articles into the formed cardboard box B. In this embodiment, the planar cardboard box sheet FB is formed into a planar shape by folding the square-tube-shaped cardboard box TB, in which the top and bottom covers of the cardboard box B are opened.

The box-making and box-packing system 100 mainly includes the box-making sub-system 10, a box-packing device 90, a conveying device 91, and the control device 92, as shown in FIGS. 1 and 5.

The box-making sub-system 10 is a system configured to unfold a cardboard box sheet FB and form a cardboard box B. In this embodiment, the process carried out by the box-making sub-system 10 is referred to as a box-making process. The box-packing device 90 is a device to pack articles into the cardboard box B. In this embodiment, the process carried out by the box-packing device 90 is referred to as a box-packing process. The conveying device 91 is a device for conveying a cardboard box B into which articles have been packed, and conveying the packed box out of the box-making and box-packing system 100. The control device 92 is a device that controls the box-making sub-system 10, the box-packing device 90, and the conveying device 91.

The box-making and box-packing system 100 executes a box-making process and a box-packing process while moving the cardboard box sheet FB and the cardboard box B. The arrows D1 to D6 in FIG. 1 indicate the movement direction of the cardboard box sheet FB or the cardboard box B in the box-making and box-packing system 100. The cardboard box sheet FB is conveyed to the box-packing device 90 through a stacking section 12, the box-opening section 14, and a bottom cover forming section 15 included in the box-making sub-system 10, as shown by the arrows D1 to D6 in FIG. 1.

Specifically, the box-making and box-packing system 100 takes out one cardboard box sheet FB at a time, which is stacked in the stacking section 12, and moves the cardboard box sheet FB to the box-opening section 14 located forward and upward of the stacking section 12 (see arrow D1). The box-opening section 14 unfolds the cardboard box sheet FB supplied from the stacking section 12, and deforms the sheet into a square-tube-shaped cardboard box TB. At this time, the cardboard box sheet FB, while being unfolded, is moved to the bottom cover forming section 15 located forward and downward (see arrow D2).

The bottom cover forming section 15 forms a bottom cover BC on the square-tube-shaped cardboard box TB. The square-tube-shaped cardboard box TB (cardboard box B) with the bottom cover BC formed thereon is moved forward toward a lowering start location (see arrow D3). In this embodiment, the lowering start location is a location where the square-tube-shaped cardboard box TB (cardboard box B) with the bottom cover BC formed thereon is conveyed downward. Having been conveyed to the lowering start location, the cardboard box B is dropped and supplied to the box-packing device 90 located below (see arrow D4). The box-making and box-packing system 100 packs, with the box-packing device 90, a plurality of articles into the cardboard box B, which has been dropped and supplied and whose opening faces to the side (the left). After a predetermined quantity of articles are packed into the cardboard box B, the box-packing device 90 rotates the cardboard box B so that the bottom cover BC, which had been facing to the right, comes to face downward. The box-packing device 90 then moves the cardboard box B, of which the opening faces upward, to the conveying device 91 located below the box-packing device 90 (see arrow D5). The box-making and box-packing system 100 then moves the cardboard box B to the next process (out of the box-making and box-packing system 100) by means of the conveying device 91 (see arrow D6).

The cardboard box B and the cardboard box sheet FB used in the box-making and box-packing system 100, and the box-making sub-system 10 and the control device 92 included in the box-making and box-packing system 100, are described in detail below.

(2) Cardboard Box and Cardboard Box Sheet

The cardboard box B and the cardboard box sheet FB used in the box-making and box-packing system 100 are described using FIGS. 7A, 7B, 8A, and 8B. FIG. 7A is a perspective view of a cardboard box B in which articles are packed. FIG. 7B is a bottom view (seen from the side with the bottom cover BC) of a cardboard box B to be packed with articles. FIG. 8A is a view, as seen from a third side surface C13 and a fourth side surface C14 (described hereinafter), of a cardboard box sheet FB, which is the cardboard box B folded into a planar shape, in a state in which it is raised perpendicular so that a fourth folding portion FP4 (described hereinafter) is placed at the bottom. FIG. 8B is a view, as seen from the side (the side with an opening where bottom-cover-side flaps C31 to C34, described hereinafter, are disposed), of a cardboard box sheet FB, which is the cardboard box B folded into a planar shape, in a state in which it is raised perpendicular so that the fourth folding portion FP4 is placed at the bottom.

(2-1) Cardboard Box

The cardboard box B mainly has a square tube part TP, top-cover-side flaps C21 to C24, and bottom-cover-side flaps C31 to C34, as shown in FIG. 7A or 7B. The square tube part TP is a portion (side surface part) configuring the side surfaces of the cardboard box B. The square tube part TP has a first side surface C11, a second side surface C12, a third side surface C13, and a fourth side surface C14, as shown in FIG. 7A. The first side surface C11, the second side surface C12, the third side surface C13, and the fourth side surface C14 are joined in a ring shape in the order listed.

The square tube part TP has a first folding portion FP1, a second folding portion FP2, a third folding portion FP3, and a fourth folding portion FP4 (see FIG. 7A). The first folding portion FP1 is located at the border by the first side surface C11 and the second side surface C12. The second folding portion FP2 is located at the border between the second side surface C12 and the third side surface C13. The third folding portion FP3 is located at the border between the third side surface C13 and the fourth side surface C14. The fourth folding portion FP4 is located at the border between the fourth side surface C14 and the first side surface C11. The two side surfaces adjacent on either sides of the folding portions FP1 to FP4 are orthogonal to each other. The first side surface C11 and the third side surface C13 of the square tube part TP are parallel to each other, and the second side surface C12 and the fourth side surface C14 are parallel to each other. The length of the third side surface C13 (the distance between the second folding portion FP2 and the third folding portion FP3) is a length L1. The length of the first side surface C11, which is opposite the third side surface C13, is also the length L1. The length of the fourth side surface C14 (the distance between the third folding portion FP3 and the fourth folding portion FP4) is a length L2. The length of the second side surface C12, which is opposite the fourth side surface C14, is also the length L2.

The top-cover-side flaps C21 to C24 are flaps that are folded in to serve as the top cover of the cardboard box B. The bottom-cover-side flaps C31 to C34 are flaps that are folded in to serve as the bottom cover BC of the cardboard box B. In a cardboard box B arranged such that the bottom cover BC faces downward, the top-cover-side flap C21 extends from an upper end of the first side surface C11, and the bottom-cover-side flap C31 extends from a lower end of the first side surface C11. In a cardboard box B arranged such that the bottom cover BC faces downward, the top-cover-side flap C22 extends from an upper end of the second side surface C12, and the bottom-cover-side flap C32 extends from a lower end of the second side surface C12. In a cardboard box B arranged such that the bottom cover BC faces downward, the top-cover-side flap C23 extends from an upper end of the third side surface C13, and the bottom-cover-side flap C33 extends from a lower end of the third side surface C13. In a cardboard box B arranged such that the bottom cover BC faces downward, the top-cover-side flap C24 extends from an upper end of the fourth side surface C14, and the bottom-cover-side flap C34 extends from a lower end of the fourth side surface C14.

The bottom-cover-side flaps C31 to C34 are folded in by the bottom cover forming section 15 of the box-making sub-system 10 (described hereinafter) so that each overlapping an adjacent flap and thus serves as the bottom cover BC of the cardboard box B, as shown in FIG. 7B. In a latter process of the box-making and box-packing system 100 according to the present embodiment, the top-cover-side flaps C21 to C24 are, similar to the bottom-cover-side flaps C31 to C34, folded in so that each overlapping an adjacent flap and thus serves as a top cover of the cardboard box B.

In this embodiment, the bottom-cover-side flaps C31 to C34 and the top-cover-side flaps C21 to C24 are folded in so that each overlapping an adjacent flap and thus serves as covers of the cardboard box B, but no limitation is provided thereby. For example, the bottom cover BC may be formed by folding the bottom-cover-side flap C32 and the bottom-cover-side flap C34 so as to overlap outer sides of the bottom-cover-side flap C31 and the bottom-cover-side flap C33, and then attaching a tape to a border part of the bottom-cover-side flap C32 and the bottom-cover-side flap C34. Also, the top cover may be formed by folding the top-cover-side flap C22 and the top-cover-side flap C24 so as to overlap outer sides of the top-cover-side flap C21 and the top-cover-side flap C23, and then attaching a tape to a border part of the top-cover-side flap C22 and the top-cover-side flap C24.

In the present embodiment, the cardboard box B represents a cardboard box in which only the bottom cover BC has been formed and the top cover has not yet been formed.

(2-2) Cardboard Box Sheet

The cardboard box sheet FB is a square-tube-shaped cardboard box TB folded into a flat surface shape (see FIGS. 8A and 8B).

The term "square-tube-shaped cardboard box TB" means a cardboard box in which the bottom cover BC and the top cover have not yet been formed. The square-tube-shaped cardboard box TB has openings at both ends because the top cover and the bottom cover BC are open. The shape of the square tube part TP of the square-tube-shaped cardboard box TB is the same as the shape of the square tube part TP of the cardboard box B. In other words, in the square-tube-shaped cardboard box TB, two side surfaces adjacent on either side of the folding portions FP1 to FP4 are orthogonal to each other. Additionally, in the square-tube-shaped cardboard box TB, the first side surface C11 and the third side surface C13 are parallel to each other, and the second side surface C12 and the fourth side surface C14 are parallel to each other.

The cardboard box sheet FB is in a state such that the square tube part TP is greatly bent along two opposing folding portions (the second folding portion FP2 and the fourth folding portion FP4), as shown in FIGS. 8A and 8B. The cardboard box sheet FB is bent so that the angles formed by two surfaces adjacent on either side of the second folding portion FP2 and the fourth folding portion FP4 are both approximately 0° (see FIG. 8B). In other words, the cardboard box sheet FB is bent along the second folding portion FP2 so that the inner wall of the second side surface C12 and the inner wall of the third side surface C13 are close together. Additionally, the cardboard box sheet FB is bent along the fourth folding portion FP4 so that the inner wall of the fourth side surface C14 and the inner wall of the first side surface C11 are close together.

Also, the cardboard box sheet FB is bent so that the angles formed by two surfaces adjacent on either side of the first folding portion FP1 and the third folding portion FP3 are both approximately 180° (see FIG. 8B). In the cardboard box sheet FB, the first folding portion FP1 is opened so that the inner wall of the first side surface C11 and the inner wall of the second side surface C12 are separated from each other. In the cardboard box sheet FB, the third folding portion FP3 is opened so that the inner wall of the third side surface C13 and the inner wall of the fourth side surface C14 are separated from each other.

In the cardboard box sheet FB, the first and second side surfaces C11, C12 and the third and fourth side surfaces C13, C14 overlap each other.

In other words, in the cardboard box sheet FB, the first side surface C11 and the second side surface C12 are disposed in the same imaginary plane (this plane is referred to as a first imaginary plane), and the third side surface C13 and the fourth side surface C14 are disposed in the same imaginary plane (this plane is referred to as a second imaginary plane), which is parallel with the first imaginary plane and adjacent to the first imaginary plane. In this embodiment, the wording "two side surfaces are disposed in the same imaginary plane" includes not only cases in which the side surfaces are disposed strictly within the same imaginary plane, but also cases in which the side surfaces are disposed substantially within the same imaginary plane. Additionally, the wording "the first imaginary plane and the second imaginary plane are parallel" includes not only cases in which the imaginary planes are strictly parallel, but also cases in which the imaginary planes are substantially parallel. Additionally, the wording "the first imaginary plane and the second imaginary plane are adjacent" means that the imaginary planes are in contact each other or are aligned with almost no gap therebetween.

In the folded cardboard box sheet FB, the first side surface C11, the top-cover-side flap C21, and the bottom-cover-side flap C31 are disposed in the same imaginary plane. Additionally, in the folded cardboard box sheet FB, the second side surface C12, the top-cover-side flap C22, and the bottom-cover-side flap C32 are disposed in the same imaginary plane. In other words, the first and second side surfaces C11, C12, the top-cover-side flaps C21, C22, and the bottom-cover-side flaps C31, C32 are disposed in the same imaginary plane (the previously-described first imaginary plane).

In the folded cardboard box sheet FB, the third side surface C13, the top-cover-side flap C23, and the bottom-cover-side flap C33 are disposed in the same imaginary plane. Additionally, in the folded cardboard box sheet FB, the fourth side surface C14, the top-cover-side flap C24, and the bottom-cover-side flap C34 are disposed in the same imaginary plane. In other words, the third and fourth side surfaces C13, C14, the top-cover-side flaps C23, C24, and the bottom-cover-side flaps C33, C34 are disposed in the same imaginary plane (the previously-described second imaginary plane).

In the box-making and box-packing system 100 according to the present embodiment, the cardboard box sheet FB is placed on the stacking section 12 of the box-making sub-system 10 (described hereinafter) in an posture such that the second folding portion FP2 is at the upper end of the cardboard box sheet FB and the fourth folding portion FP4 is at the lower end of the cardboard box sheet FB. Additionally, in the box-making and box-packing system 100 according to the present embodiment, the cardboard box sheet FB is placed on the stacking section 12 so that the first side surface C11 and the second side surface C12 of the cardboard box sheet FB are disposed on the rear side and the third side surface C13 and the fourth side surface C14 of the cardboard box sheet FB are disposed on the front side.

(3) Box-Making Sub-System

The box-making sub-system 10 is a system that creates a cardboard box B by unfolding the flat-surface-shaped cardboard box sheet FB to form square-tube-shaped cardboard box TB, and further forming the bottom cover BC. The box-making sub-system 10 is disposed farther upstream in the conveying direction than the box-packing device 90 in the box-making and box-packing system 100. The box-making sub-system 10 mainly has the stacking section 12, a transferring section 13, the box-opening section 14, and the bottom cover forming section 15.

The configurations of the box-making sub-system 10 are described in detail below.

(3-1) Stacking Section

The stacking section 12 is a unit to store upright cardboard box sheets FB. The term "upright cardboard box sheet FB" means a cardboard box sheet FB which is in a posture that the second folding portion FP2 is at the upper end of the cardboard box sheet FB and the fourth folding portion FP4 is at the lower end of the cardboard box sheet FB. The cardboard box sheets FB are placed on the stacking section 12 in a posture such that the cardboard box sheets FB extend parallel to the conveying direction (see arrow D1). Numerous cardboard box sheets FB are stored in the stacking section 12 in a stacked state (in a state such that the first side surface C11 and the second side surface C12 of one cardboard box sheet FB are adjacent to the third side surface C13 and the fourth side surface C14 of another cardboard box sheet FB disposed adjacent to the rear side of the first cardboard box sheet FB). The stacking section 12 also functions as a unit to move the numerous stored cardboard box sheets FB forward.

The stacking section 12 is positioned farthest upstream in the box-making sub-system 10. Additionally, the stacking section 12 is arranged to the lowest location in the box-making sub-system 10. The numerous cardboard box sheets FB stacked in the stacking section 12 are moved one at a time by the transferring section 13, in order starting with the cardboard box sheet FB disposed in the front, to the box-opening section 14 arranged at a higher location.

Figure 2:
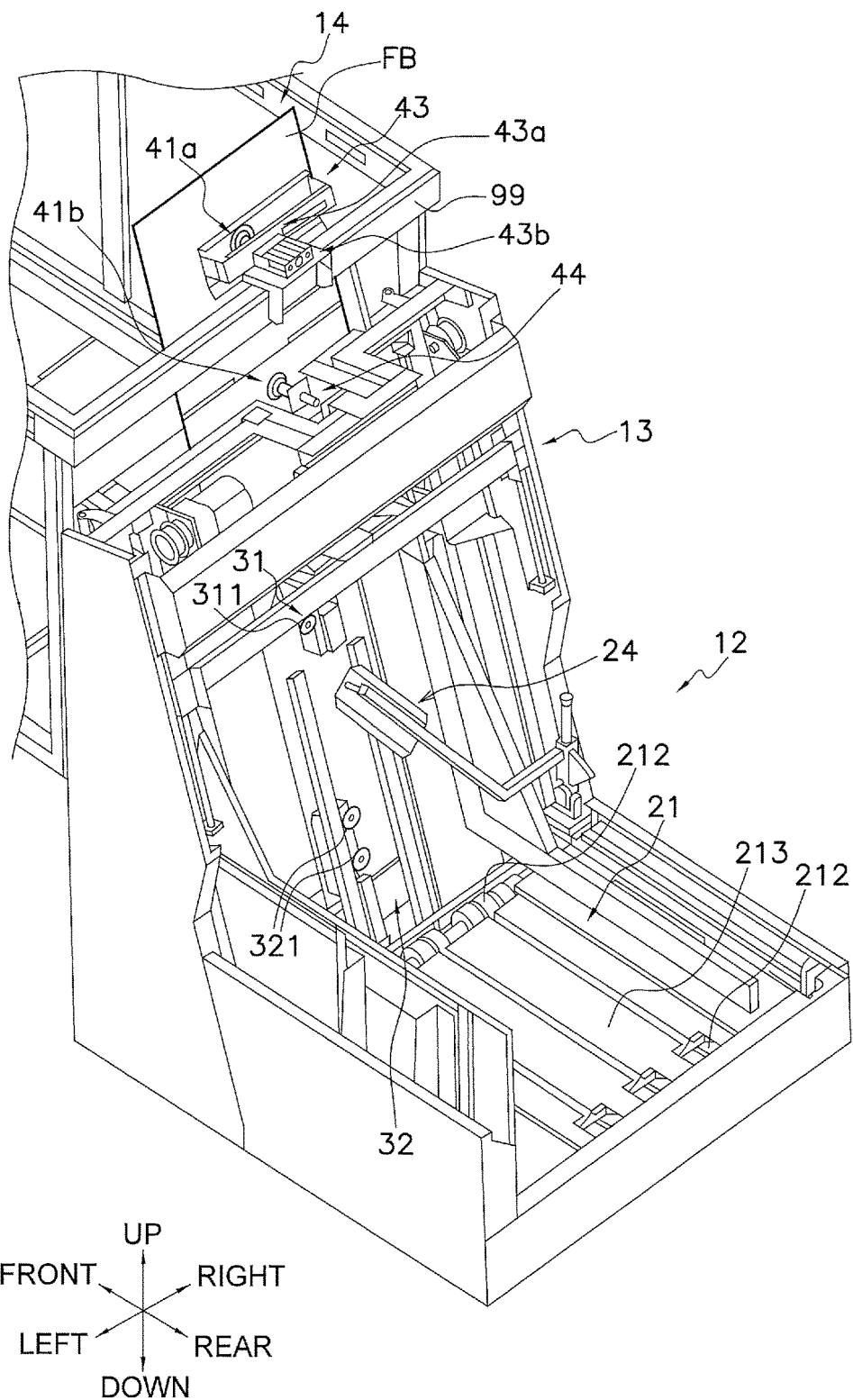
FIG. 2 is a schematic perspective view of a box-making sub-system of the box-making and box-packing system of FIG. 1.

The stacking section 12 mainly has a placement section 21 and a rear plate 24 (see FIG. 2).

Upright cardboard box sheets FB are placed on the placement section 21. The cardboard box sheets FB are stored in a stacked state in the placement section 21. The placement section 21 mainly has a roller 212 driven by a drive mechanism (not shown), and an endless belt 213 wound around the roller 212 (see FIG. 2). When the foremost cardboard box sheet FB is moved to the box-opening section 14 by the transferring section 13 (described hereinafter), the roller 212 is driven by the drive mechanism and the cardboard box sheets FB on the placement section 21 are moved forward by the endless belt 213.

The rear plate 24 is a member to push the numerous cardboard box sheets FB stacked in the placement section 21 from the rear. The rear plate 24 applies constant force to the farthest rearward cardboard box sheet FB placed on the placement section 21 from the rear. The rear plate 24 gradually moves forward when the cardboard box sheets FB placed on the placement section 21 decrease in number.

(3-2) Transferring Section

The transferring section 13 is a unit to sequentially take out and transfer the leading (foremost) cardboard box sheet FB from the plurality of cardboard box sheets FB stacked in the stacking section 12, and supplies the taken cardboard box sheet FB to the box-opening section 14. The transferring section 13 is disposed downstream of the stacking section 12. The transferring section 13 is disposed on the side where the third side surface C13 and fourth side surface C14 of the leading (foremost) cardboard box sheet FB stacked in the stacking section 12 are present.

The transferring section 13 mainly has a separating mechanism 31 and an upward transferring mechanism 32 (see FIG. 2).

The separating mechanism 31 mainly has a forward-rearward movable suction disk 311 capable of moving forward and rearward (see FIG. 2). The forward-rearward movable suction disk 311 of the separating mechanism 31 is configured to be capable of sucking a part of the third side surface C13 of the cardboard box sheet FB being transferred. In the separating mechanism 31, the forward-rearward movable suction disk 311 is moved forward by a drive mechanism (not shown), whereby the cardboard box sheet FB suctioned by the forward-rearward movable suction disk 311 is separated from the adjacent cardboard box sheet FB placed on the placement section 21 of the stacking section 12.

The upward transferring mechanism 32 mainly has (see FIG. 2) upward-downward movable suction disks 321 capable of moving upward and downward, and a pawl (not shown) capable of moving upward and downward. The upward-downward movable suction disks 321 are configured to be capable of sucking a part of the fourth side surface C14 of the transferred (to-be-transferred) cardboard box sheet FB, which is separated from the adjacent cardboard box sheet FB by the separating mechanism 31. The pawl (not shown) is configured so as to come into contact from below with the lower end of the transferred (to-be-transferred) cardboard box sheet FB, which is separated from the adjacent cardboard box sheet FB by the separating mechanism 31. In the upward transferring mechanism 32, the upward-downward movable suction disks 321 and the pawl are moved upward (in the direction of arrow D1 in FIG. 1) by a drive mechanism (not shown), whereby the cardboard box sheet FB is transferred to a location where the sheet is handed over to the box-opening section 14.

(3-3) Box-Opening Section

The box-opening section 14 is a unit to unfold a folded cardboard box sheet FB in which, the first side surface C11 and the second side surface C12 are overlapping the third side surface C13 and the fourth side surface C14, thus form a square-tube-shaped cardboard box TB. In other words, the box-opening section 14 is a unit to transform a cardboard box sheet FB, which was received from the transferring section 13, from a planar shape to a square tube shape. The box-opening section 14 is arranged above the transferring section 13 as shown in FIGS. 1 and 2. The box-opening section 14 takes the cardboard box sheet FB transferred from below as shown by arrow D1 in FIG. 1 and performs an unfolding action on the cardboard box sheet FB.

Figure 3:
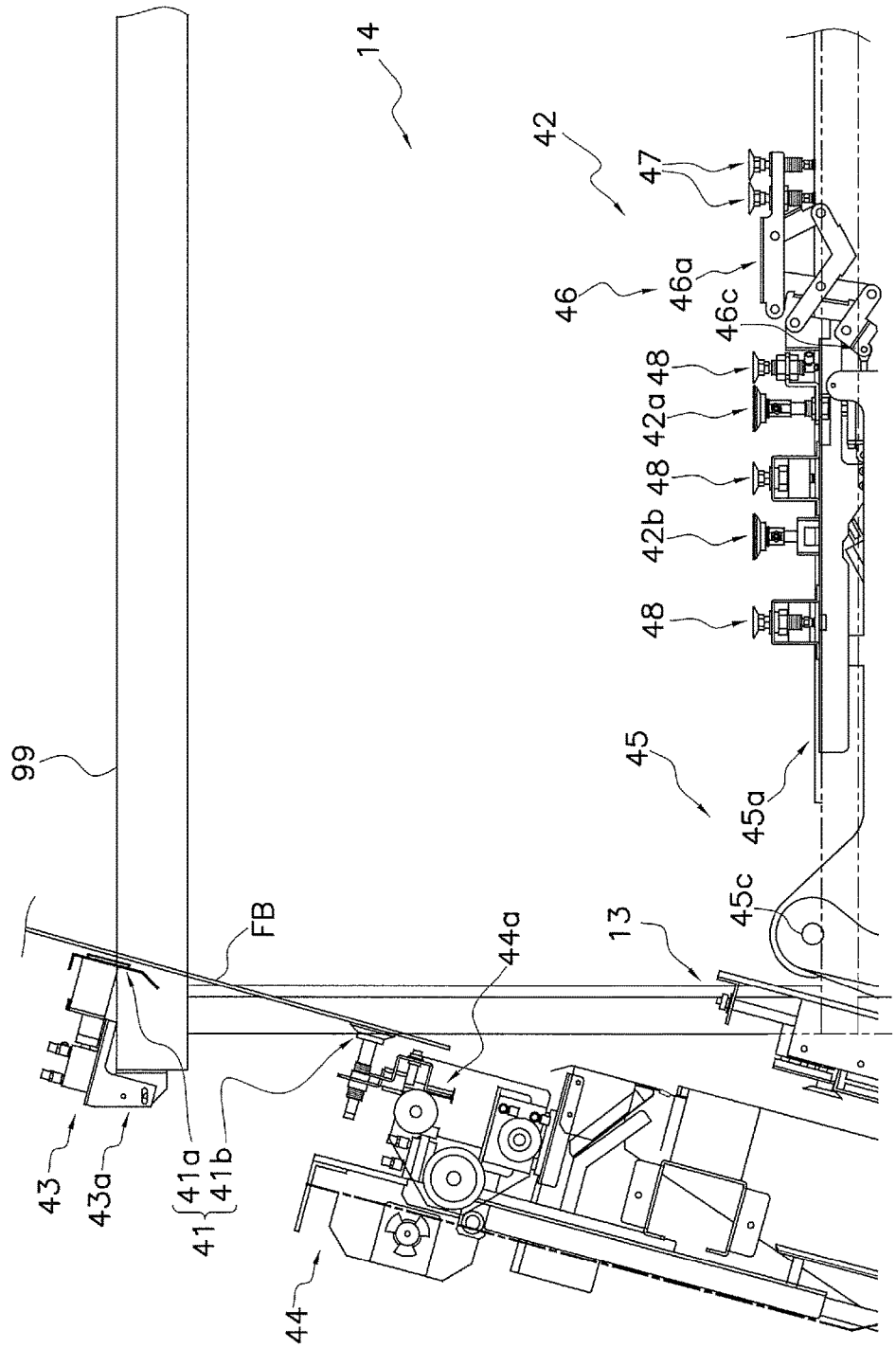
FIG. 3 is a schematic side view of a box-opening section of the box-making sub-system of FIG. 2.

The box-opening section 14 mainly has a rear-surface grasping mechanism 41, a front-surface grasping mechanism 42, a first movement mechanism 43, a second movement mechanism 44, a third movement mechanism 45, and a fourth movement mechanism 46, as shown in FIG. 3.

Figure 6C:
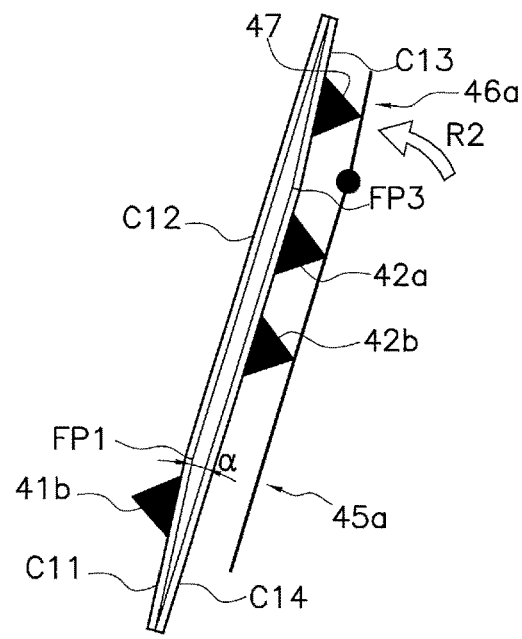
FIG. 6C is a drawing for illustrating the unfolding action of the cardboard box sheet in the box-opening section of FIG. 3 and depicts a state at the end of the initial action and a state in which, while the first arm is stopped, the second arm is caused to change posture relative to the first arm so that the first side surface and the third side surface become parallel to each other and the second side surface and the fourth side surface become parallel to each other.

The rear-surface grasping mechanism 41 includes an upper suction disk 41a and a lower suction disk 41b (see FIG. 3). The upper suction disk 41a grasps a side surface (second side surface C12) on the upper side of the rear surface of the cardboard box sheet FB that has been transferred by the transferring section 13 (see FIG. 6A). The lower suction disk 41b grasps a side surface (first side surface C11) on the lower side of the rear surface of the cardboard box sheet FB that has been transferred by the transferring section 13 (see FIG. 6A). The lower suction disk 41b is an example of a first grasping part to grasp the first side surface C11.

The front-surface grasping mechanism 42 includes a first main-arm-side suction disk 42a, a second main-arm-side suction disk 42b, main-arm-side auxiliary suction disks 48, and sub-arm-side suction disks 47 (see FIG. 3). The first main-arm-side suction disk 42a and the second main-arm-side suction disk 42b grasp a side surface (fourth side surface C14) on the lower side of the front surface of the cardboard box sheet FB that has been transferred by the transferring section 13 (see FIG. 6A). The first main-arm-side suction disk 42a and the second main-arm-side suction disk 42b are an example of a second grasping part to grasp the fourth side surface C14. The main-arm-side auxiliary suction disks 48 also grasp the side surface (fourth side surface C14) on the lower side of the front surface of the cardboard box sheet FB that has been transferred by the transferring section 13. The sub-arm-side suction disks 47 grasp a side surface (third side surface C13) on the upper side of the front surface of the cardboard box sheet FB that has been transferred by the transferring section 13 (see FIG. 6A). The sub-arm-side suction disks 47 are an example of a third grasping part to grasp the third side surface C13.

The upper suction disk 41a is movably supported by the first movement mechanism 43. The lower suction disk 41b is movably supported by the second movement mechanism 44. The first main-arm-side suction disk 42a, the second main-arm-side suction disk 42b, and the main-arm-side auxiliary suction disks 48 are movably supported by the third movement mechanism 45. A sub arm 46a of the fourth movement mechanism 46 supporting the sub-arm-side suction disks 47 is linked to a main arm 45a of the third movement mechanism 45 (described hereinafter). In other words, the sub-arm-side suction disks 47 are also movably supported by the third movement mechanism 45. Furthermore, the sub-arm-side suction disks 47 are movably supported by the fourth movement mechanism 46.

(3-3-1) Rear-Surface Grasping Mechanism, First Movement Mechanism, and Second Movement Mechanism (a) Rear-Surface Grasping Mechanism The rear-surface grasping mechanism 41 is a suction-holding tool. The rear-surface grasping mechanism 41 includes the upper suction disk 41a and the lower suction disk 41b. The upper suction disk 41a and the lower suction disk 41b perform a suction-holding action when negative pressure is created at the suction surfaces using a vacuum pump or the like (not shown). The upper suction disk 41a is disposed above the lower suction disk 41b. In this embodiment, a number of each of the upper suction disk 41a and the lower suction disk 41b is one, but the number of each suction disk is not limited to one. A number of each of the upper suction disk 41a and the lower suction disk 41b may be plural.

The upper suction disk 41a grasps the second side surface C12 disposed on the upper side of the rear-surface side of the cardboard box sheet FB transferred by the transferring section 13. In other words, the upper suction disk 41a suction-holds the second side surface C12 of the cardboard box sheet FB, which is located higher than the first folding portion FP1. The upper suction disk 41a preferably suction-holds a part of the second side surface C12 that is in the vicinity of the first folding portion FP1.

The lower suction disk 41b grasps the first side surface C11 disposed on the lower side of the rear-surface side of the cardboard box sheet FB transferred by the transferring section 13. In other words, the lower suction disk 41b suction-holds the first side surface C11 of the cardboard box sheet FB, which is located lower than the first folding portion FP1. The lower suction disk 41b preferably suction-holds a part of the first side surface C11 that is in the vicinity of the first folding portion FP1.

The upper suction disk 41a performs a suction-holding action (grasping action) of the second side surface C12 at a suction-holding location (described hereinafter). The lower suction disk 41b starts the suction-holding action (grasping action) of the first side surface C11 at an unfolding start location (described hereinafter), and then, after a main action of the unfolding action (described hereinafter) is started, continues the suction-holding action until a predetermined timing preceding the end of the main action.

(b) First Movement Mechanism

The first movement mechanism 43 is a mechanism to support the upper suction disk 41a such that the upper suction disk 41a can move forward and backward. The first movement mechanism 43 mainly has an upper support part 43a and a first drive part 43b (see FIGS. 2, 3, and 5). The upper support part 43a is connected with the first drive part 43b and driven by the first drive part 43b. The first drive part 43b is not limited but is, e.g., an air cylinder.

The first drive part 43b is attached to a frame body 99 of the box-making and box-packing system 100 as shown in FIG. 2. The frame body 99 is disposed at the highest location among frame bodies serving as a framework of the box-making and box-packing system 100.

The upper support part 43a supports the upper suction disk 41a such that the upper suction disk 41a can move forward and backward. The upper support part 43a is driven by the first drive part 43b, thereby causing the supporting upper suction disk 41a to move forward and backward.

The upper support part 43a supports the upper suction disk 41a such that the upper suction disk 41a can move between a standby location and a suction-holding location.

The standby location of the upper suction disk 41a is located to the rear from the suction-holding location of the upper suction disk 41a. The standby location of the upper suction disk 41a is a location where the upper suction disk 41a stands by while the upper suction disk 41a does not suction-hold the second side surface C12 of the cardboard box sheet FB. The suction-holding location of the upper suction disk 41a is a location where the cardboard box sheet FB transferred by the transferring section 13 is taken by the upper suction disk 41a. At the suction-holding location, the upper suction disk 41a comes into contact with the second side surface C12 of the cardboard box sheet FB and suction-holds the second side surface C12. The upper support part 43a supports the upper suction disk 41a so that the suction-holding surface of the upper suction disk 41a moved to the suction-holding location becomes parallel with the second side surface C12 of the cardboard box sheet FB transferred from the transferring section 13.

Due to the upper support part 43a being driven by the first drive part 43b, the upper suction disk 41a is moved forward and the upper suction disk 41a is moved from the standby location to the suction-holding location. Also, due to the upper support part 43a being driven by the first drive part 43b, the upper suction disk 41a is retracted and the upper suction disk 41a is moved from the suction-holding location to the standby location.

Until the box-opening section 14 starts the unfolding action (described hereinafter), the upper support part 43a supports the upper suction disk 41a, which suction-holds the second side surface C12 of the cardboard box sheet FB, at the suction-holding location. The upper suction disk 41a then ceases grasping the second side surface C12, and before the box-opening section 14 starts the unfolding action, the upper support part 43a driven by the first drive part 43b moves the upper suction disk 41a, which is disposed at the suction-holding location, to the standby location.

(c) Second Movement Mechanism

The second movement mechanism 44 is a mechanism to support the lower suction disk 41b such that the lower suction disk 41b is able to move forward/backward and up/down. The second movement mechanism 44 mainly has a lower support part 44a and a second drive part 44b (see FIGS. 3 and 5). The lower support part 44a is connected with the second drive part 44b and driven by the second drive part 44b. The second drive part 44b is not limited but is, e.g., an air cylinder. The lower support part 44a supports the lower suction disk 41b at a location lower than the upper support part 43a.

The lower support part 44a supports the lower suction disk 41b such that the lower suction disk 41b is able to move forward/backward and up/down. The lower support part 44a is driven by the second drive part 44b, whereby the supporting lower suction disk 41b is moved forward and backward. When the cardboard box sheet FB is moved (when the unfolding action of the cardboard box sheet FB is performed) while the lower suction disk 41*b* suction-holds the first side surface C11 of the cardboard box sheet FB, the lower suction disk 41*b* moves along with the movement of the cardboard box sheet FB. The lower support part 44*a* supports the lower suction disk 41*b* even when the lower suction disk 41*b* is moving along with the movement of the cardboard box sheet FB.

The lower support part 44*a* supports the lower suction disk 41*b* such that the lower suction disk 41*b* is able to move between a standby location and an unfolding start location, and also between the unfolding start location and a grasp release location.

The standby location of the lower suction disk 41*b* is located to the rear from the unfolding start location of the lower suction disk 41*b*. The standby location of the lower suction disk 41*b* is a location where the lower suction disk 41*b* stands by while the lower suction disk 41*b* does not suction-holds the first side surface C11 of the cardboard box sheet FB. The unfolding start location of the lower suction disk 41*b* is a location where the lower suction disk 41*b* takes the cardboard box sheet FB being transferred by the transferring section 13. At the unfolding start location, the lower suction disk 41*b* comes into contact with the first side surface C11 of the cardboard box sheet FB and suction-holds the first side surface C11. Also, the unfolding start location of the lower suction disk 41*b* is a location where the lower suction disk 41*b* is disposed at the start of the unfolding action of the box-opening section 14. The lower support part 44*a* supports the lower suction disk 41*b* so that the suction-holding surface of the lower suction disk 41*b* moved to the unfolding start location becomes parallel with the first side surface C11 of the cardboard box sheet FB transferred from the transferring section 13.

Due to the lower support part 44*a* being driven by the second drive part 44*b*, the lower suction disk 41*b* is moved forward and the lower suction disk 41*b* is moved from the standby location to the unfolding start location. Also, due to the lower support part 44*a* being driven by the second drive part 44*b*, the lower suction disk 41*b* is retracted and the lower suction disk 41*b* is moved from the unfolding start location to the standby location.

As described above, even when the box-opening section 14 starts the unfolding action (described hereinafter), the lower suction disk 41*b* suction-holds the first side surface C11 of the cardboard box sheet FB until a predetermined timing. The lower suction disk 41*b* supported by the lower support part 44*a* moves forward, backward, left, and right along with the movement of the cardboard box sheet FB while being supported by the lower support part 44*a*. The lower suction disk 41*b* moves from the unfolding start location to a location (grasp release location) where the lower suction disk 41*b* releases the grasp on the first side surface C11. After the lower suction disk 41*b* has released the grasp of the first side surface C11, the lower suction disk 41*b* is returned to the standby location.

(3-3-2) Front-Surface Grasping Mechanism, Third Movement Mechanism, and Fourth Movement Mechanism (a) Front-Surface Grasping Mechanism The front-surface grasping mechanism 42 is a suction-holding tool. The front-surface grasping mechanism 42 includes the first main-arm-side suction disk 42*a*, the second main-arm-side suction disk 42*b*, the main-arm-side auxiliary suction disks 48, and the sub-arm-side suction disks 47 (see FIG. 3). The first main-arm-side suction disk 42*a*, the second main-arm-side suction disk 42*b*, the main-arm-side auxiliary suction disks 48, and the sub-arm-side suction disks 47 perform a suction-holding action when negative pressure is created at the suction surfaces using a vacuum pump or the like (not shown). Numbers of first main-arm-side suction disk 42*a*, the second main-arm-side suction disk 42*b*, the main-arm-side auxiliary suction disks 48, and the sub-arm-side suction disks 47 are not limited to the numbers illustrated and may be decided as appropriate. Additionally, the first main-arm-side suction disk 42*a* and the second main-arm-side suction disk 42*b* are preferably both provided, but one may be omitted.

The first main-arm-side suction disk 42*a*, the second main-arm-side suction disk 42*b*, and the main-arm-side auxiliary suction disks 48 are secured to the main arm 45*a* (see FIG. 3), which is capable of turning about a rotating shaft 45*c* of the third movement mechanism 45 (described hereinafter). The main arm 45*a* changes a posture by turning about the rotating shaft 45*c* (see FIGS. 6A to 6F). The first main-arm-side suction disk 42*a* disposed in the unfolding start location (described hereinafter) is located above the second main-arm-side suction disk 42*b* disposed in the unfolding start location (described hereinafter) (see FIG. 6A). Additionally, the first main-arm-side suction disk 42*a* disposed in the standby location (unfolding complete location) (described hereinafter) is located in front of the second main-arm-side suction disk 42*b* (see FIG. 3) disposed in the standby location (unfolding complete location) (described hereinafter).

The first main-arm-side suction disk 42*a*, the second main-arm-side suction disk 42*b*, and the main-arm-side auxiliary suction disks 48 grasp the fourth side surface C14 (see FIG. 6A; the main-arm-side auxiliary suction disks 48 are not depicted in FIGS. 6A to 6F), which is disposed on the lower side of the front-surface side of the cardboard box sheet FB transferred by the transferring section 13. In other words, at the unfolding start location (described hereinafter), the first main-arm-side suction disk 42*a*, the second main-arm-side suction disk 42*b*, and the main-arm-side auxiliary suction disks 48 suction-hold the fourth side surface C14 (see FIG. 6A) of the cardboard box sheet FB, which is located lower than the third folding portion FP3. The first main-arm-side suction disk 42*a* preferably suction-holds a part of the fourth side surface C14 that is in the vicinity of the third folding portion FP3. The second main-arm-side suction disk 42*b* suction-holds a part of the fourth side surface C14 that is located lower than the part suction-held by the first main-arm-side suction disk 42*a* (see FIG. 6A). The main-arm-side auxiliary suction disks 48 grasp the fourth side surface C14 near the portion grasped by the first main-arm-side suction disk 42*a* or the second main-arm-side suction disk 42*b*.

The sub-arm-side suction disks 47 are secured to the sub arm 46*a* (see FIG. 3) (described hereinafter), which is capable of turning about a rotating shaft 46*c* of the fourth movement mechanism 46. The sub arm 46*a* is attached so as to be able to turn about the rotating shaft 46*c*, which is arranged at an end part of the main arm 45*a* of the third movement mechanism 45 (described hereinafter). By turning about the rotating shaft 46*c*, the sub arm 46*a* changes a posture relative to the main arm 45*a* (see FIGS. 6B to 6F). The sub-arm-side suction disks 47 disposed in the unfolding start location (described hereinafter) are located above the first main-arm-side suction disk 42*a*, the second main-arm-side suction disk 42*b*, and the main-arm-side auxiliary suction disks 48 disposed in the unfolding start locations (described hereinafter) (see FIG. 6A). Also, the sub-arm-side suction disks 47 disposed in the standby location (described hereinafter) are located in front of the first main-arm-side suction disk 42a, the second main-arm-side suction disk 42b, and the main-arm-side auxiliary suction disks 48 disposed in the standby locations (described hereinafter) (see FIG. 3).

The sub-arm-side suction disks 47 grasp the third side surface C13 (see FIG. 6A), which is disposed on the upper side of the front-surface side of the cardboard box sheet FB transferred by the transferring section 13. In other words, at the unfolding start location (described hereinafter), the sub-arm-side suction disks 47 suction-hold the third side surface C13 of the cardboard box sheet FB, which is located higher than the third folding portion FP3.

The first main-arm-side suction disk 42a, the second main-arm-side suction disk 42b, the main-arm-side auxiliary suction disks 48, and the sub-arm-side suction disks 47 start a suction action (grasping action) at the unfolding start locations (described hereinafter). The first main-arm-side suction disk 42a, the second main-arm-side suction disk 42b, the main-arm-side auxiliary suction disks 48, and the sub-arm-side suction disks 47 then continue the suction action at least until moving to the unfolding complete locations (described hereinafter).

(b) Third Movement Mechanism

The third movement mechanism 45 is a mechanism to movably support the first main-arm-side suction disk 42a, the second main-arm-side suction disk 42b, and the main-arm-side auxiliary suction disks 48. The third movement mechanism 45 swings and changes the locations of the first main-arm-side suction disk 42a, the second main-arm-side suction disk 42b, and the main-arm-side auxiliary suction disks 48.

The third movement mechanism 45 mainly has the main arm 45a, a third drive part 45b, and the rotating shaft 45c (see FIGS. 3 and 5).

The main arm 45a is a member that extends forward/backward direction in a state in which the first main-arm-side suction disk 42a, the second main-arm-side suction disk 42b, and the main-arm-side auxiliary suction disks 48 are disposed in standby locations (unfolding complete locations) (described hereinafter). The first main-arm-side suction disk 42a, the second main-arm-side suction disk 42b, and the main-arm-side auxiliary suction disks 48s are attached to the main arm 45a along the direction in which the main arm 45a extends (see FIG. 3). When the first main-arm-side suction disk 42a, the second main-arm-side suction disk 42b, and the main-arm-side auxiliary suction disks 48 are disposed in the standby locations, the main arm 45a supports the first main-arm-side suction disk 42a, the second main-arm-side suction disk 42b, and the main-arm-side auxiliary suction disks 48 so that the suction-holding surfaces of the first main-arm-side suction disk 42a, the second main-arm-side suction disk 42b, and the main-arm-side auxiliary suction disks 48 face upward. Also, when the first main-arm-side suction disk 42a, the second main-arm-side suction disk 42b, and the main-arm-side auxiliary suction disks 48 are disposed in the unfolding start locations (described hereinafter), the main arm 45a supports the first main-arm-side suction disk 42a, the second main-arm-side suction disk 42b, and the main-arm-side auxiliary suction disks 48 so that the suction-holding surfaces of the first main-arm-side suction disk 42a, the second main-arm-side suction disk 42b, and the main-arm-side auxiliary suction disks 48 become parallel with the fourth side surface C14 of the cardboard box sheet FB transferred to the transferring section 13.

The rotating shaft 45c is a shaft for causing the main arm 45a to turn. The rotating shaft 45c is arranged to a location lower than the lower suction disk 41b, as shown in FIG. 3. The rotating shaft 45c is arranged in the vicinity of the rear-side end of the main arm 45a. The rotating shaft 45c extends left/right direction. The third drive part 45b causes the main arm 45a to turn clockwise/counterclockwise in a right-side view so that the main arm 45a traces an arc centered around the rotating shaft 45c. The third drive part 45b is not limited but is, e.g., a servo motor. The main arm 45a changes a posture by being driven by the third drive part 45b (see FIGS. 6A to 6F). In other words, due to the main arm 45a being driven by the third drive part 45b, the inclination relative to the horizontal direction changes in a right-side view (see FIGS. 6A to 6F). By causing the main arm 45a to turn, the third movement mechanism 45 moves the first main-arm-side suction disk 42a, the second main-arm-side suction disk 42b, and the main-arm-side auxiliary suction disks 48 between the standby locations (unfolding complete locations) and the unfolding start locations.

Figure 4:
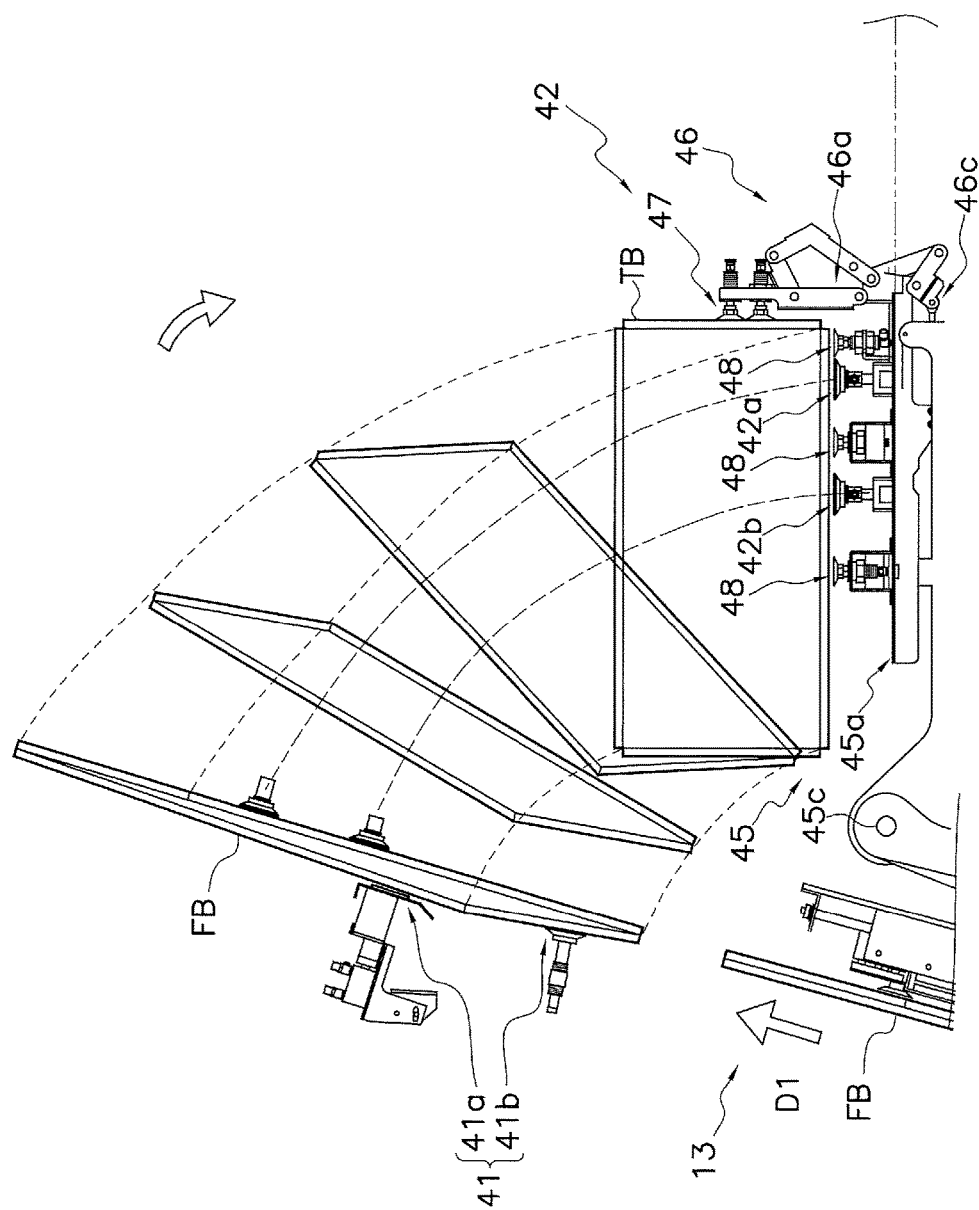
FIG. 4 is a drawing showing a state in which a cardboard box sheet is unfolded by the box-opening section of FIG. 3.

In this embodiment, the standby locations of the first main-arm-side suction disk 42a, the second main-arm-side suction disk 42b, and the main-arm-side auxiliary suction disks 48 are locations where the first main-arm-side suction disk 42a, the second main-arm-side suction disk 42b, and the main-arm-side auxiliary suction disks 48 stand by during, inter alia, the transferring of the cardboard box sheet FB by the transferring section 13. The unfolding complete locations of the first main-arm-side suction disk 42a, the second main-arm-side suction disk 42b, and the main-arm-side auxiliary suction disks 48 are locations where the first main-arm-side suction disk 42a, the second main-arm-side suction disk 42b, and the main-arm-side auxiliary suction disks 48 are disposed when the box-opening section 14 completes the unfolding action. The standby locations and the unfolding complete locations of the first main-arm-side suction disk 42a, the second main-arm-side suction disk 42b, and the main-arm-side auxiliary suction disks 48 are respectively the same locations (see FIGS. 3 and 4). When the first main-arm-side suction disk 42a, the second main-arm-side suction disk 42b, and the main-arm-side auxiliary suction disks 48 are disposed in the standby locations and the unfolding complete locations, the main arm 45a is in a state of extending horizontally forward/backward direction. When the first main-arm-side suction disk 42a, the second main-arm-side suction disk 42b, and the main-arm-side auxiliary suction disks 48 are disposed in the standby locations (unfolding complete locations), the main arm 45a extends forward/backward direction at approximately the same height location as the rotating shaft 45c. In the standby locations (unfolding complete locations), the first main-arm-side suction disk 42a, the second main-arm-side suction disk 42b, and the main-arm-side auxiliary suction disks 48 are located in lower locations than the upper suction disk 41a and the lower suction disk 41b described above.

The unfolding start locations of the first main-arm-side suction disk 42a, the second main-arm-side suction disk 42b, and the main-arm-side auxiliary suction disks 48 are the locations where the first main-arm-side suction disk 42a, the second main-arm-side suction disk 42b, and the main-arm-side auxiliary suction disks 48 are disposed when the box-opening section 14 starts the unfolding action. When the first main-arm-side suction disk 42a, the second main-arm-side suction disk 42b, and the main-arm-side auxiliary suction disks 48 are disposed in the unfolding start locations, the main arm 45a is in a state of having turned counter-clockwise relative to the rotating shaft 45c, as seen in a right-side view (when seen from the same direction as the side-surface view of FIG. 3), in comparison with the state when the first main-arm-side suction disk 42a, the second main-arm-side suction disk 42b, and the main-arm-side auxiliary suction disks 48 are disposed in the standby locations. When the first main-arm-side suction disk 42a, the second main-arm-side suction disk 42b, and the main-arm-side auxiliary suction disks 48 are disposed in the unfolding start locations, the main arm 45a is in a state of having turned approximately 90° counterclockwise relative to the rotating shaft 45c, as seen in a right-side view, in comparison with the state when the first main-arm-side suction disk 42a, the second main-arm-side suction disk 42b, and the main-arm-side auxiliary suction disks 48 are disposed in the standby locations. Due to the main arm 45a being turned about the rotating shaft 45c by the third drive part 45b, the first main-arm-side suction disk 42a, the second main-arm-side suction disk 42b, and the main-arm-side auxiliary suction disks 48 move between the unfolding start locations and the unfolding complete locations (standby locations). In the unfolding start locations, the first main-arm-side suction disk 42a, the second main-arm-side suction disk 42b, and the main-arm-side auxiliary suction disks 48 attached to the main arm 45a come into contact with the fourth side surface C14 of the cardboard box sheet FB and suction-hold (grasp) the fourth side surface C14. When the first main-arm-side suction disk 42a, the second main-arm-side suction disk 42b, and the main-arm-side auxiliary suction disks 48 are disposed in the unfolding start locations, the main arm 45a extends upward and to the forward from the rotating shaft 45c as a reference. The first main-arm-side suction disk 42a, the second main-arm-side suction disk 42b, and the main-arm-side auxiliary suction disks 48 in the unfolding start locations are located in higher locations than the first main-arm-side suction disk 42a, the second main-arm-side suction disk 42b, and the main-arm-side auxiliary suction disks 48 in the standby locations.

The third movement mechanism 45 is also a mechanism to movably support the sub-arm-side suction disks 47 secured to the sub arm 46a, which is linked so as to be capable of changing the posture relative to the main arm 45a. The third movement mechanism 45 causes the sub-arm-side suction disks 47 to swing and change location.

(c) Fourth Movement Mechanism

The fourth movement mechanism 46 is a mechanism to movably support the sub-arm-side suction disks 47. The fourth movement mechanism 46 swings and changes the location of the sub-arm-side suction disks 47.

The fourth movement mechanism 46 mainly has the sub arm 46a, a fourth drive part 46b, and the rotating shaft 46c (see FIGS. 3 and 5).

The sub arm 46a is configured so as to be capable of turning about the rotating shaft 46c attached to the swinging-side end of the main arm 45a (the end on the opposite side of the rotating-shaft 45c-adjacent side of the main arm 45a). The rotating shaft 46c is a shaft for turning the sub arm 46a. The rotating shaft 46c extends to the left and right. The fourth drive part 46b causes the sub arm 46a to turn clockwise/counterclockwise as seen in a right-side view so that the sub arm 46a traces an arc centered about the rotating shaft 46c. The fourth drive part 46b is not limited but is, e.g., an air cylinder. The sub arm 46a changes a posture relative to the main arm 45a by being driven by the fourth drive part 46b (see FIGS. 6B to 6F). In other words, the sub arm 46a changes its inclination relative to the main arm 45a (see FIGS. 6B to 6F), as seen in a right-side view, by being driven by the fourth drive part 46b. The sub arm 46a is linked so as to be capable of changing a posture between a first posture and a second posture relative to the main arm 45a.

The sub arm 46a, when in the first posture relative to the main arm 45a, extends in the same direction as the direction in which the main arm 45a extends. When in the second orientation relative to the main arm 45a, the sub arm 46a extends in a direction orthogonal to the direction in which the main arm 45a extends. Two sub-arm-side suction disks 47 are attached along the direction in which the sub arm 46a extends (see FIG. 3).

The sub-arm-side suction disks 47 are configured such that when the first main-arm-side suction disk 42a, the second main-arm-side suction disk 42b, and the main-arm-side auxiliary suction disks 48 are in the standby locations and the sub arm 46a is in the first posture relative to the main arm 45a, the sub-arm-side suction disks 47 are supported so that the suction-holding surfaces of the sub-arm-side suction disks 47 face upward. The location of the sub-arm-side suction disks 47 at this time is referred to as the standby location of the sub-arm-side suction disks 47.

The sub-arm-side suction disks 47 are configured such that when the first main-arm-side suction disk 42a, the second main-arm-side suction disk 42b, and the main-arm-side auxiliary suction disks 48 are in the unfolding complete locations and the sub arm 46a is in the second posture relative to the main arm 45a, the sub-arm-side suction disks 47 are supported so that the suction-holding surfaces of the sub-arm-side suction disks 47 face rearward. The location of the sub-arm-side suction disks 47 at this time is referred to as the unfolding complete location of the sub-arm-side suction disks 47.

The sub-arm-side suction disks 47 are configured such that when the first main-arm-side suction disk 42a, the second main-arm-side suction disk 42b, and the main-arm-side auxiliary suction disks 48 are in the unfolding start locations and the sub arm 46a is in the first posture relative to the main arm 45a, the sub-arm-side suction disks 47 are supported so that the suction-holding surfaces of the sub-arm-side suction disks 47 are parallel with the third side surface C13 of the cardboard box sheet FB transferred by the transferring section 13. The location of the sub-arm-side suction disks 47 at this time is referred to as the unfolding start location of the sub-arm-side suction disks 47.

When the main arm 45a causes the first main-arm-side suction disk 42a, the second main-arm-side suction disk 42b, and the main-arm-side auxiliary suction disks 48 to move from the standby locations to the unfolding start locations, the sub arm 46a is in the first posture. In other words, when the main arm 45a causes the first main-arm-side suction disk 42a, the second main-arm-side suction disk 42b, and the main-arm-side auxiliary suction disks 48 to move from the standby locations to the unfolding start locations, the main arm 45a and the sub arm 46a extend in a straight line. Therefore, when the first main-arm-side suction disk 42a, the second main-arm-side suction disk 42b, and the main-arm-side auxiliary suction disks 48 move from the unfolding start locations to the unfolding complete locations for the box-opening section 14 performing the unfolding action, the sub arm 46a is preferably in the first posture relative to the main arm 45a from the start of the unfolding action (the start of an initial action described hereinafter) until the movement of the main arm 45a is stopped in the initial action. After the main arm 45a stopped in the initial action, the sub arm 46a is preferably caused to rotate about the rotating shaft 46c by the fourth drive part 46b, and the posture of the sub arm 46a is continuously changed from the first posture of extending in a straight line from the main arm 45a to the second posture of extending in a direction orthogonal to the main arm 45a. The movement of the sub arm 46*a* is preferably controlled at an appropriate timing so that when the initial action ends, the first side surface C11 and the third side surface C13 become parallel to each other and the second side surface C12 and the fourth side surface C14 become parallel to each other. Additionally, the movements of the main arm 45*a* and the sub arm 46*a* are preferably controlled at the appropriate timing and speed (angular speed of rotation) so that during the main action as well, the first side surface C11 and the third side surface C13 become parallel to each other and the second side surface C12 and the fourth side surface C14 become parallel to each other. Specifically, for example, the action timing and speed of the main arm 45*a* and the action timing of the sub arm 46*a* are preferably controlled as described above by the control device 92 (described hereinafter).

When the first main-arm-side suction disk 42*a*, the second main-arm-side suction disk 42*b*, and the main-arm-side auxiliary suction disks 48 have been caused to move to the unfolding complete locations, the sub arm 46*a* has come to be orthogonal to the main arm 45*a*. The first main-arm-side suction disk 42*a*, the second main-arm-side suction disk 42*b*, and the main-arm-side auxiliary suction disks 48, disposed in the unfolding complete locations, suction-hold the fourth side surface C14 of the square-tube-shaped cardboard box TB, and the sub-arm-side suction disks 47, disposed in the unfolding complete location, suction-holds the third side surface C13 of the square-tube-shaped cardboard box TB.

After the unfolding action by the box-opening section 14, when the bottom cover BC is formed on the square-tube-shaped cardboard box TB by the bottom cover forming section 15 (described hereinafter), the posture of the sub arm 46*a* relative to the main arm 45*a* is changed from the second posture to the first posture. In other words, after the cardboard box B has been formed, the posture of the sub arm 46*a* is changed so that it extends in a straight line with the main arm 45*a*.

(3-4) Bottom Cover Forming Section

The bottom cover forming section 15 is a unit to form the bottom cover BC on the square-tube-shaped cardboard box TB. In other words, the bottom cover forming section 15 is a unit to transform the bottom-cover-side flaps C31 to C34 provided to the lower side of the square tube part TP into the bottom cover BC. The bottom cover forming section 15 is disposed in the vicinity of the first main-arm-side suction disk 42*a* and the second main-arm-side suction disk 42*b* in the unfolding complete locations. The bottom cover forming section 15 forms the bottom cover BC in the square-tube-shaped cardboard box TB at the location where the action of unfolding the cardboard box sheet FB is completed.

The bottom cover forming section 15 has a flap-holding part and a flap-push-bending part (not shown). The flap holding part holds the end parts (first end parts) on one widthwise side in each of the bottom-cover-side flaps C31 to C34. The flap-push-bending part pushes and bends the other widthwise end sides (second end parts) of the bottom-cover-side flaps C31 to C34 toward the inner side of the square tube part TP. The flap-holding part releases the hold on the first end parts of the bottom-cover-side flaps C31 to C34 after holding these parts for a predetermined time period while the flap-push-bending part pushes on the second end parts of the bottom-cover-side flaps C31 to C34. As a result, the first end part of each of the bottom-cover-side flaps C31 to C34 is folded in so as to overlap the second end part of the adjacent bottom-cover-side flaps C31 to C34, and the bottom cover BC of the cardboard box B is formed.

The square-tube-shaped cardboard box TB (cardboard box B), in which the bottom cover BC is formed by the bottom cover forming section 15, is moved horizontally as shown by arrow D3 in FIG. 1, and then passes through a falling path leading downward and is moved to the box-packing device 90.

The bottom cover forming section 15 does not need to form a bottom cover BC such as that described above. For example, the bottom cover forming section 15 may form the bottom cover BC by folding the bottom-cover-side flap C31 and the bottom-cover-side flap C33 inward, then folding the bottom-cover-side flap C32 and the bottom-cover-side flap C34 so as to overlap the outer sides of the bottom-cover-side flap C31 and the bottom-cover-side flap C33, and affixing tape to the border of the bottom-cover-side flap C32 and the bottom-cover-side flap C34.

(4) Control Device

The control device 92 controls the box-making sub-system 10, the box-packing device 90, and the conveying device 91. The control device 92 is electrically connected with the configurations of the box-making sub-system 10 including, inter alia, the stacking section 12, the transferring section 13, the box-opening section 14, and the bottom cover forming section 15, as shown in FIG. 5, and is configured so as to send and receive signals to and from these configurations. Additionally, the control device 92 is electrically connected with the box-packing device 90 and the conveying device 91, and is configured so as to send and receive signals to and from these devices. The control device 92 is an example of a control part of the box-opening device. The box-opening section 14 and the control device 92 function as a box-opening device.

The control device 92 includes an input/output part 93, a storage part 94, and a control part 95, as shown in FIG. 5.

(4-1) Input/Output Part

The input/output part 93 is not limited but is, e.g., a touch panel.

The input/output part 93 functions as an input part configured such that an operator of the box-making and box-packing system 100 can input commands for the box-making and box-packing system 100 and information needed for the operation of the box-making and box-packing system 100. Additionally, the input/output part 93 functions as an output part to display operation conditions, etc., of the box-making and box-packing system 100.

The information inputted to the input/output part 93 includes information pertaining to the size of the cardboard box sheet FB. Information pertaining to the length of the fourth side surface C14 of the cardboard box sheet FB (information pertaining to the length L2) is preferably inputted into the input/output part 93 as the information pertaining to the size of the cardboard box sheet FB. Because the length of the fourth side surface C14 is the same as the length of the second side surface C12, information pertaining to the length of the second side surface C12 of the cardboard box sheet FB may be inputted as information pertaining to the length of the fourth side surface C14 of the cardboard box sheet FB. The information pertaining to the length of the fourth side surface C14 is, e.g., the value of the length L2. Additionally, information pertaining to the length of the first side surface C11 of the cardboard box sheet FB (information pertaining to the length L1) is preferably inputted into the input/output part 93 as information pertaining to the size of the cardboard box sheet FB. The information pertaining to the length of the first side surface C11 is, e.g., the value of the length L1.

In this embodiment, the control device 92 has the input/output part 93, which has the functions of both an input part and an output part, but this example is not provided by way of limitation. The control device 92 may have an input part and an output part configured separately.

(4-2) Storage Part

The storage part 94 is configured from, e.g., a ROM, a ROM, a hard disk (HDD), etc. Various programs executed by the control part 95 are stored in the storage part 94. Also stored in the storage part 94 includes various information needed by the control part 95 in order to control the box-making and box-packing system 100.

The storage part 94 has an angle information storage area 94a as a storage area relating to the unfolding action of the cardboard box sheet FB. The angle information storage area 94a stores information of angles $\alpha$ formed by the first side surface C11 and the fourth side surface C14 at a time when the initial action of the unfolding action (described hereinafter) is completed according to the size of the cardboard box sheet FB. Preferably, the angle information storage area 94a stores information of the angles $\alpha$ formed by the first side surface C11 and the fourth side surface C14 at a time when the initial action is completed according to the length L2 of the fourth side surface C14 of the cardboard box sheet FB. Preferably, there is a relationship between the length L2 of the fourth side surface C14 of the cardboard box sheet FB and the angle $\alpha$ formed by the first side surface C11 and the fourth side surface C14 at a time when the initial action is completed (the angle $\alpha$ formed between the inner surface of the first side surface C11 and the inner surface of the fourth side surface C14) such that the angle $\alpha$ becomes a greater value as the length L2 becomes greater. The angle $\alpha$ may change continuously with changing of the length L2, or the angle $\alpha$ may change non-continuously (stepwise) with changing of the length L2. The angle $\alpha$ is not limited but changes within, e.g., a range of 5° to 20° according to the length L2.

(4-3) Control Part

The control part 95 is mainly configured from a CPU. The control part 95 reads and executes programs stored in the storage part 94, and performs control on the configurations of the box-making sub-system 10 including, inter alia, the stacking section 12, the transferring section 13, the box-opening section 14, and the bottom cover forming section 15, and also on the box-packing device 90 and the conveying device 91.

As control on the box-opening section 14, the control device 92 controls the movements of the first drive part 43b, the second drive part 44b, the third drive part 45b, and the fourth drive part 46b of the box-opening section 14, and/or the suction-holding/suction-hold releasing by the suction disks 41a, 41b, 42a, 42b, 47, 48, so that the unfolding action of the cardboard box sheet FB is executed in the box-opening section 14. The specific control of the box-opening section 14 performed by the control device 92 is described hereinafter.

The control part 95 has a preliminary box-opening angle calculation part 95a as a functioning part relating to the unfolding action of the cardboard box sheet FB.

The preliminary box-opening angle calculation part 95a is a functioning part to calculate a preliminary box-opening angle $\theta$ for causing the main arm 45a to rotate from the location where the main arm 45a is disposed in order to dispose the first main-arm-side suction disk 42a, the second main-arm-side suction disk 42b, and the main-arm-side auxiliary suction disks 48 in the unfolding start locations, to completion of the initial action of the unfolding action of the cardboard box sheet FB (see FIG. 6B). The location where the main arm 45a is disposed in order to dispose the first main-arm-side suction disk 42a, the second main-arm-side suction disk 42b, and the main-arm-side auxiliary suction disks 48 in the unfolding start locations is the same regardless of the size of the cardboard box sheet FB.

The preliminary box-opening angle calculation part 95a specifically functions, for example, as follows.

First, when information pertaining to the length L2 of the fourth side surface C14 of the cardboard box sheet FB (e.g., the value of the length L2) is inputted to the input/output part 93, the preliminary box-opening angle calculation part 95a refers to the angle information storage area 94a and determines the angle $\alpha$ formed by the first side surface C11 and the fourth side surface C14 at the completion of the initial action corresponding to the inputted information.

Figure 11:
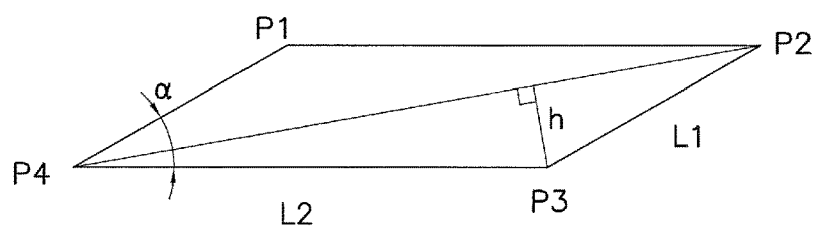
FIG. 11 is a drawing for illustrating a preliminary box-opening angle calculation method performed by a preliminary box-opening angle calculation part of the control part of FIG. 5.

The preliminary box-opening angle calculation part 95a calculates the preliminary box-opening angle $\theta$ of the main arm 45a, which is for implementing the determined angle $\alpha$, using the information pertaining to the size of the cardboard box sheet FB (e.g., the value of the length L1 and the value of the length L2) and the value of the determined angle $\alpha$. For example, the preliminary box-opening angle calculation part 95a may calculate the preliminary box-opening angle $\theta$ using a function for calculating the preliminary box-opening angle $\theta$ stored in advance in the storage part 94. The function for calculating the preliminary box-opening angle $\theta$ may have, e.g., a distance h shown in FIG. 11 as a parameter. This distance h is a measurement of a parallelogram shaped as in FIG. 11 (a parallelogram having a side of length L1, a side of length L2, and an angle $\alpha$ as the angle formed between the side of length L1 and the side of length L2). The distance h in this drawing is the length of a line that extends from vertex P3 and that is perpendicular to a diagonal between vertex P4 and vertex P2, where the angle is angle $\alpha$, in the parallelogram of FIG. 11. The preliminary box-opening angle calculation part 95a calculates the distance h based on the information pertaining to the size of the cardboard box sheet FB, and may calculate the preliminary box-opening angle $\theta$ based on this value.

(5) Unfolding Action of Cardboard Box Sheet Performed by Box-Opening Section

The unfolding action of the cardboard box sheet FB performed by the box-opening section 14 shall now be described. The aspect of the action described below is one example, and such an aspect is not provided by way of limitation.

First, as the first stage of the unfolding action, the control part 95 of the control device 92 controls the transferring section 13 and supplies the cardboard box sheet FB to the box-opening section 14. In other words, the control part 95 moves the cardboard box sheet FB, with the upward transferring mechanism 32 of the transferring section 13, to a location where the upper suction disk 41a and the lower suction disk 41b can respectively suction-hold the second side surface C12 and the first side surface C11 of the cardboard box sheet FB when the upper suction disk 41a and the lower suction disk 41b are moved to the suction-holding locations.

Next, the control part 95 activates the first drive part 43b and the second drive part 44b and causes the upper suction disk 41a and the lower suction disk 41b to move to the suction-holding locations. Furthermore, the control part 95 causes the upper suction disk 41a and the lower suction disk 41b to execute the suction-holding action, and the cardboard box sheet FB transferred by the transferring section 13 is taken by the upper suction disk 41a and the lower suction disk 41b.

Next, the control part 95 causes the first main-arm-side suction disk 42a, the second main-arm-side suction disk 42b, the main-arm-side auxiliary suction disks 48, and the sub-arm-side suction disks 47 disposed in the standby locations to move to the unfolding start locations by activating the third drive part 45b and turning the main arm 45a. Furthermore, the control part 95 causes the first main-arm-side suction disk 42a, the second main-arm-side suction disk 42b, and the main-arm-side auxiliary suction disks 48 to execute the suction-holding action and suction-hold the fourth side surface C14 of the cardboard box sheet FB held by the upper suction disk 41a and the lower suction disk 41b. Additionally, the control part 95 causes the sub-arm-side suction disks 47 to execute the suction-holding action and suction-hold the third side surface C13 of the cardboard box sheet FB held by the upper suction disk 41a and the lower suction disk 41b. The control part 95 then causes the suction-holding action of the upper suction disk 41a to stop.

In this state, the unfolding action of the cardboard box sheet FB is executed by the box-opening section 14. The unfolding action of the cardboard box sheet FB includes the initial action and the main action performed after the initial action.

The initial action is performed in order to form gaps between the first and second side surface C11, C12 and the third and fourth side surfaces C13, C14 of the folded cardboard box sheet FB overlapping each other. The initial action is an action for suppressing situations in which the space between the first and second side surface C11, C12 and the third and fourth side surface C13, C14 come to be lower in pressure than the surroundings due to the third and fourth side surfaces C13, C14 being moved quickly and the cardboard box sheet FB does not open readily.

In the initial action, the third drive part 45b is controlled by the control part 95 and the main arm 45a is moved at or below a predetermined speed (predetermined angular speed w). In the initial action, the main arm 45a is moved so as to turn clockwise about the rotating shaft 45c in a right-side surface view (see arrow R1 in FIG. 6B). For example, in the initial action, the control part 95 moves the main arm 45a so that the maximum angular speed is equal to or less than the predetermined angular speed ω. In the present embodiment, in the initial action, the main arm 45a is moved so that the maximum angular speed is equal to or less than the predetermined angular speed ω and the main arm 45a temporarily stops before the start of the main action (see FIG. 10A).

In the initial action, the main arm 45a is preferably temporarily stopped before the start of the main action, but this configuration is not provided by way of limitation. For example, in the initial action of another example, when the angular speed of the main arm 45a reaches the predetermined angular speed ω, the control part 95 may then control the movement of the main arm 45a so that the main arm 45a moves at a constant angular speed (at the predetermined angular speed ω) (see FIG. 10B). Further, in the initial action of another example, the control part 95 may control the movement of the main arm 45a so that the angular speed of the main arm 45a gradually increases until ultimately reaching the predetermined angular speed ω (see FIG. 10C).

During the initial action, the main arm 45a is caused to turn (clockwise in a right-side surface view) by the preliminary box-opening angle θ calculated by the above-described preliminary box-opening angle calculation part 95a from the location where the main arm 45a is disposed in order to dispose the first main-arm-side suction disk 42a, the second main-arm-side suction disk 42b, and the main-arm-side auxiliary suction disks 48 in the unfolding start locations (see FIG. 6B).

As in FIG. 10A, when the main arm 45a is caused to stop after having turned by the preliminary box-opening angle θ in the initial action, the sub arm 46a is caused to rotate at the timing at which the main arm 45a was caused to stop. The rotation of the sub arm 46a may be caused to start simultaneously with the timing at which the main arm 45a stops, and the rotation of the sub arm 46a may be caused to start at a timing slightly later than that at which the main arm 45a stops or at a timing slightly earlier than that at which the main arm 45a stops. The movement of the sub arm 46a is preferably controlled at an appropriate timing so that when the initial action ends, the first side surface C11 and the third side surface C13 are parallel to each other and the second side surface C12 and the fourth side surface C14 are parallel to each other. In other words, when the initial action ends, the cardboard box sheet FB forms preferably a parallelogram in which the first side surface C11 and the third side surface C13 are parallel to each other and the second side surface C12 and the fourth side surface C14 are parallel to each other in a right-side surface view. The inner angle of the first side surface C11 and the fourth side surface C14 in this parallelogram is the angle α.

Figure 10B:
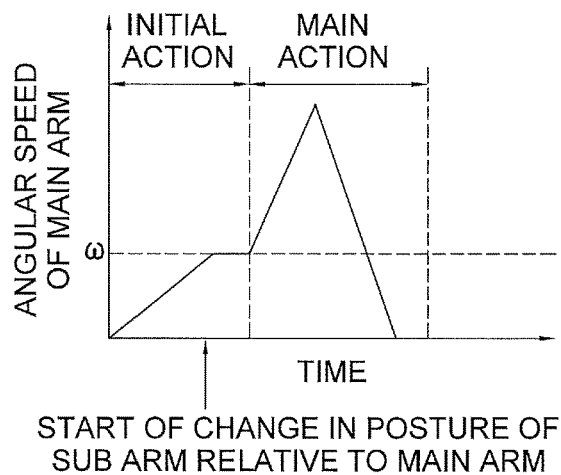
FIG. 10B is a drawing showing another example of the change in angular speed of the main arm in the unfolding action of the cardboard box sheet by the box-opening section of FIG. 3.
Figure 10C:
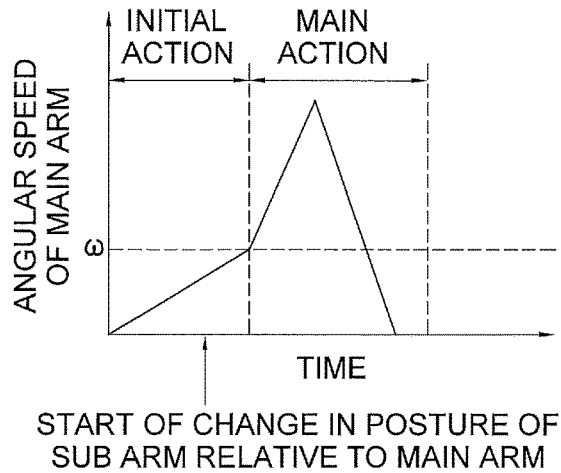
FIG. 10C is a drawing showing another example of the change in angular speed of the main arm in the unfolding action of the cardboard box sheet by the box-opening section of FIG. 3.

Even when the angular speed of the main arm 45a is caused to change as in FIG. 10B or FIG. 10C, the movement of the main arm 45a is controlled so that when the initial action ends (e.g., when the angular speed is greater than the predetermined angular speed ω), the main arm 45a comes to be rotated by the preliminary box-opening angle θ from the location where the main arm 45a is disposed in order to dispose the first main-arm-side suction disk 42a, the second main-arm-side suction disk 42b, and the main-arm-side auxiliary suction disks 48 in the unfolding start locations. Additionally, even when the angular speed of the main arm 45a is caused to change as in FIG. 10B or FIG. 10C, the movement of the sub arm 46a is preferably controlled at an appropriate timing so that when the initial action ends, the first side surface C11 and the third side surface C13 are parallel to each other and the second side surface C12 and the fourth side surface C14 are parallel to each other.

The main action is performed after the initial action. In the main action, the main arm 45a is moved faster than the predetermined speed (the predetermined angular speed ω). For example, in the main action, the main arm 45a is moved so that the maximum angular speed is higher than the predetermined angular speed ω.

The unfolding action of the cardboard box sheet FB shall now be described using the flowchart of FIG. 9. In the initial action of the present embodiment, the main arm 45a is moved so as to temporarily stop before the start of the main action (see FIG. 10A).

First, in step S1, the unfolding action of the cardboard box sheet FB, particularly the initial action, is started. In step S1, the control part 95 activates the third drive part 45b and changes the posture of the main arm 45a while the first main-arm-side suction disk 42a and the second main-arm-side suction disk 42b grasp the fourth side surface C14. In step S1, when the control part 95 changes the posture of the main arm 45a, the main-arm-side auxiliary suction disks 48 are also grasping the fourth side surface C14 and the sub-arm-side suction disks 47 are grasping the third side surface C13.

While changing the angular speed of the main arm 45a as in FIG. 10A, the control part 95 controls the movement of the main arm 45*a* so that the angle formed by the first side surface C11 and the fourth side surface C14 at the completion of the initial action become the angle α determined according to the size of the cardboard box sheet FB (see FIG. 6B). The angle α formed by the first side surface C11 and the fourth side surface C14 at the completion of the initial action is determined according to, e.g., the length L2 of the fourth side surface C14 of the cardboard box sheet FB as described above. Preferably, the angle α formed by the first side surface C11 and the fourth side surface C14 at the completion of the initial action is determined to be a value that becomes greater with a greater length L2 of the fourth side surface C14 of the cardboard box sheet FB as described above. As a specific control, the control part 95 causes the main arm 45*a* to turn by the preliminary box-opening angle θ calculated in advance by the preliminary box-opening angle calculation part 95*a*, so that the angle formed by the first side surface C11 and the fourth side surface C14 at the completion of the initial action becomes the angle α. The control part 95 then causes the main arm 45*a* to temporarily stop at the point in time when the main arm 45*a* has been moved by the preliminary box-opening angle θ.

Preferably, in step S1 at the start of the initial action, the control part 95 moves the main arm 45*a* without changing the posture of the sub arm 46*a* relative to the main arm 45*a*.

Next, in step S2, the control part 95 causes the fourth drive part 46*b* to activate and changes the posture of the sub arm 46*a* relative to the main arm 45*a* while the sub-arm-side suction disks 47 are grasping the third side surface C13. Particularly, in this embodiment, the control part 95 causes the main arm 45*a* to stop and causes the posture of the sub arm 46*a* to change relative to the main arm 45*a* (see FIGS. 6C and 10A). The sub arm 46*a* is caused to rotate counterclockwise about the rotating shaft 46*c* in a right-side surface view (see arrow R2 in FIG. 6C). The control part 95 preferably causes the main arm 45*a* to stop and the posture of the sub arm 46*a* to change relative to the main arm 45*a* as in the present embodiment, but this configuration is not provided by way of limitation. The posture of the sub arm 46*a* may be changed relative to the main arm 45*a* while the main arm 45*a* is moved.

It is preferable that initial action ends at the timing at which the first side surface C11 and the third side surface C13 become parallel to each other and the second side surface C12 and the fourth side surface C14 become parallel to each other in a right-side surface view, the sequence transitions to step S3, and the main action is started. Due to the cardboard box sheet FB during unfolding being in a parallelogram shape at the end of the initial action in a side surface view as in FIG. 6C, unreasonable force is particularly unlikely to act on the cardboard box sheet FB during the main action. Therefore, it is easy to suppress the occurrence of failure of the box-opening action.

Figure 6D:
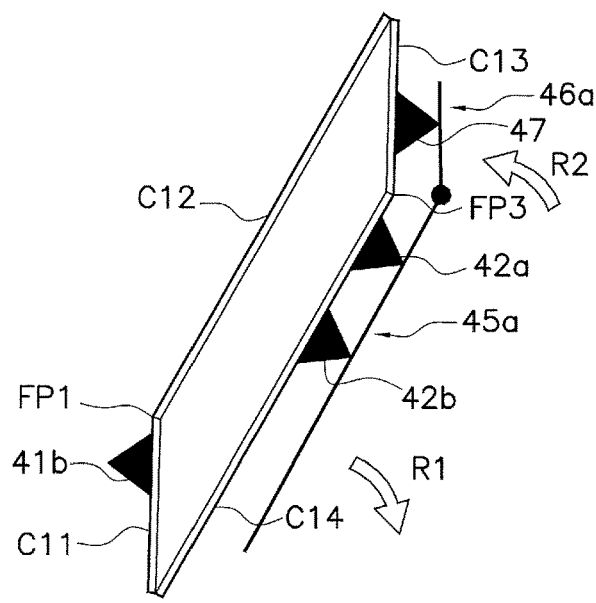
FIG. 6D is a drawing for illustrating the unfolding action of the cardboard box sheet in the box-opening section of FIG. 3 and depicts a state in which the first arm is moved while the second arm is caused to change posture relative to the first arm in the main action.

In step S3, the control part 95 moves the main arm 45*a* at a speed higher than the predetermined angular speed ω while causing the posture of the sub arm 46*a* to change relative to the main arm 45*a* (see FIG. 6D).

When the angular speed of the main arm 45*a* is changed as in FIGS. 10B and 10C, as the main arm 45*a* is already moving, there is no need to start moving the main arm 45*a* anew in step S3.

In the main action of the unfolding action, it is preferable that the control part 95 controls the movements of the main arm 45*a* and the sub arm 46*a* (the speed and/or timing of starting the action) so that the first side surface C11 and the third side surface C13 are parallel to each other, and also so that the second side surface C12 and the fourth side surface C14 are parallel to each other. In a case when the cardboard box sheet FB during unfolding has a parallelogram shape in a side surface view as in FIGS. 6D and 6E, it is particularly unlikely for unreasonable force to act on the cardboard box sheet FB during the main action. Therefore, it is easy to suppress occurrences of failure of the box-opening action.

In step S4, after the start of the main action, the control part 95 releases the grasping (suction-holding) of the first side surface C11 by the lower suction disk 41*b* at a predetermined timing before the end of the main action (see FIG. 6E).

In step S5, the control part 95 moves the main arm 45*a* while changing the posture of the sub arm 46*a* relative to the main arm 45*a*, and causes the first main-arm-side suction disk 42*a*, the second main-arm-side suction disk 42*b*, the main-arm-side auxiliary suction disks 48, and the sub-arm-side suction disks 47 to move to the unfolding complete location (see FIG. 6F). As a result, the cardboard box sheet FB becomes a square-tube-shaped cardboard box TB, and at this point, the unfolding action of the cardboard box sheet FB comes to an end.

After the completion of the unfolding action of the cardboard box sheet FB, the bottom cover forming section 15 forms a bottom cover BC, and when a cardboard box B is formed, the sub arm 46*a* is caused to turn from the second posture to the first posture, and the first main-arm-side suction disk 42*a*, the second main-arm-side suction disk 42*b*, the main-arm-side auxiliary suction disks 48, and the sub-arm-side suction disks 47 are disposed in the standby locations (the unfolding complete locations and the standby locations of the first main-arm-side suction disk 42*a*, the second main-arm-side suction disk 42*b*, and the main-arm-side auxiliary suction disks 48 are the same location).

(6) Characteristics (6-1)

The box-opening device according to the above embodiment has the box-opening section 14 and the control device 92. The box-opening device unfolds the folded cardboard box sheet FB, in which the first and second side surfaces C11, C12 and the third and fourth side surfaces C13, C14 overlap, and forms the square-tube-shaped cardboard box TB, in which the first side surface C11, the second side surface C12, the third side surface C13, and the fourth side surface C14 are arranged in the order listed. The box-opening device is provided with: the lower suction disk 41*b*, which is an example of a first grasping part; the main arm 45*a*, which is an example of a first arm; and the control part 95. The lower suction disk 41*b* grasps the first side surface C11. The main arm 45*a* has the first main-arm-side suction disk 42*a* and the second main-arm-side suction disk 42*b*, which grasp the fourth side surface C14. The first main-arm-side suction disk 42*a* and the second main-arm-side suction disk 42*b* are an example of a second grasping part. The main arm 45*a* changes the posture while the first main-arm-side suction disk 42*a* and the second main-arm-side suction disk 42*b* are grasping the fourth side surface C14. The control part 95 of the control device 92 controls the movement of the main arm 45*a* so that the initial action and the main action, performed after the initial action, are executed as the action of unfolding the cardboard box sheet FB. In the initial action, a gap is formed between the first and second side surfaces C11, C12 of the folded cardboard box sheet FB and the third and fourth side surfaces C13, C14 of the folded cardboard box sheet FB. In the main action, the cardboard box sheet FB is formed into a square tube shape. In the initial action, the main arm 45*a* moves at or slower than the predetermined speed, and in the main action, the main arm 45*a* moves faster than the predetermined speed. The control part 95 controls the movement of the main arm 45*a* based on the angle α formed by the first side surface C11 and the fourth side surface C14 at completion of the initial action. This angle α is determined according to the size of the cardboard box sheet FB.

In this embodiment, the movement of the main arm 45*a* is controlled based on the angle α formed by the first side surface C11 and the fourth side surface C14 at the completion of the initial action and this angle is determined according to the size of the cardboard box sheet FB. Therefore, during the main action in which the main arm 45*a* is moved at a comparatively high speed while the fourth side surface C14 is being grasped, it is possible to reduce a possibility that unreasonable force acts on the cardboard box sheet FB or excessive force acts on the lower suction disk 41*b* and other grasping parts. As a result, it is possible to achieve a highly reliable box-opening device in which occurrences of failure of the box-opening action can be suppressed.

(6-2)

In the box-opening device according to the above embodiment, the angle α formed by the first side surface C11 and the fourth side surface C14 at the completion of the initial action is determined according to the length L2 of the fourth side surface C14 of the cardboard box sheet FB.

In this embodiment, the length L2 of the fourth side surface C14 is the distance from the border between the third side surface C13 and the fourth side surface C14 (the third folding portion FP3) to the border between the fourth side surface C14 and the first side surface C11 (the fourth folding portion FP4).

In this embodiment, because the angle α formed by the first side surface C11 and the fourth side surface C14 at the completion of the initial action is determined according to the length L2 of the fourth side surface C14, it is possible, during the main action, to reduce the possibility that unreasonable force acts on the cardboard box sheet FB or excessive force acts on the lower suction disk 41*b* and other grasping parts, and occurrences of failure of the box-opening action can be suppressed.

(6-3)

In the box-opening device according to the above embodiment, the angle α formed by the first side surface C11 and the fourth side surface C14 at the completion of the initial action is determined to be a value that is greater as the length L2 of the fourth side surface C14 is longer.

In this embodiment, because the angle α formed by the first side surface C11 and the fourth side surface C14 at the completion of the initial action is determined to be greater as the length L2 of the fourth side surface C14 is longer, it is possible, during the main action, to reduce a possibility that unreasonable force acts on the cardboard box sheet FB or excessive force acts on the lower suction disk 41*b* and other grasping parts, and occurrences of failure of the box-opening action can be suppressed.

(6-4)

The box-opening device according to the above embodiment is provided with the sub arm 46*a*, which serves as an example of a second arm. The sub arm 46*a* has the sub-arm-side suction disks 47, which serve as an example of a third grasping part to grasp the third side surface C13. The sub arm 46*a* changes the posture while the sub-arm-side suction disks 47 grasps the third side surface C13. The control part 95 controls the movement of the sub arm 46*a*.

In this embodiment, because the box-opening device has the sub arm 46*a*, which changes the posture while the third side surface C13 is being grasped, the shape of the cardboard box sheet FB during unfolding can be made to approximate a shape that is not likely to be subjected to excessive force. Therefore, it is easy to suppress occurrences of failure of the box-opening action.

(6-5)

In the box-opening device according to the above embodiment, the sub arm 46*a* is linked to the main arm 45*a* so as to be able to change the posture relative to the main arm 45*a*. During the main action, the control part 95 moves the main arm 45*a* while causing the posture of the sub arm 46*a* to change relative to the main arm 45*a*.

In this embodiment, because the sub arm 46*a* is caused to change the posture relative to the main arm 45*a* during the main action, it is easy during the main action to cause the shape of the cardboard box sheet FB during unfolding to approximate a shape that is not likely to be subjected to excessive force. Therefore, it is easy to suppress occurrences of failure of the box-opening action.

(6-6)

In the box-opening device according to the above embodiment, at the start of the initial action, the control part 95 moves the main arm 45*a* without causing the posture of the sub arm 46*a* to change relative to the main arm 45*a*. Before the end of the initial action, the control part 95 causes the main arm 45*a* to stop and the posture of the sub arm 46*a* to change relative to the main arm 45*a*.

In this embodiment, because the posture of the sub arm 46*a* is changed relative to the main arm 45*a* while the main arm 45*a* is stopped in the initial action (before the start of the main action), it is particularly unlikely that for unreasonable force to act on the cardboard box sheet FB during the main action. Therefore, it is even easier to suppress occurrences of failure of the box-opening action.

(6-7)

In the box-opening device according to the above embodiment, at the end of the initial action, the control part 95 controls the movement of the sub arm 46*a* so that the first side surface C11 and the third side surface C13 become parallel to each other and the second side surface C12 and the fourth side surface C14 become parallel to each other.

In this embodiment, because the shape of the cardboard box sheet FB is made to a shape not likely to be subjected to excessive force at the completion of the initial action, it is even easier to suppress occurrences of failure of the box-opening action.

(6-8)

In the box-opening device according to the above embodiment, the sub arm 46*a* is driven by the fourth drive part 46*b*, which is an air cylinder.

In this embodiment, because the driving of the sub arm 46*a* can be achieved with a comparatively inexpensive air cylinder, equipment costs can be suppressed.

(6-9)

In the box-opening device according to the above embodiment, the lower suction disk 41*b* releases the grasping of the first side surface C11 after the start of the main action and before the end of the main action.

In this embodiment, because the lower suction disk 41*b*, and the first main-arm-side suction disk 42*a* and second main-arm-side suction disk 42*b* do not always pull the cardboard box sheet FB in opposite directions, excessive force is not likely to act on the cardboard box sheet FB, and it is even easier to suppress occurrences of failure of the box-opening action.

(7) Modifications (7-1) Modification A

In the above embodiment, a box-making and box-packing system 100 including a box-opening device was described, but this system is not provided by way of limitation. For example, the box-opening device may be an independent device which has the box-opening section 14 of the above embodiment and portions relevant to the actions of the box-opening section 14 of the control device 92.

In the above embodiment, the control device 92 performs control on configurations besides the box-opening section 14 as well, but this embodiment is not provided by way of limitation, and the box-opening device may have a specially designated control part.

(7-2) Modification B

In the above embodiment, when information pertaining to the length L2 of the fourth side surface C14 of the cardboard box sheet FB is inputted to the input/output part 93, the preliminary box-opening angle calculation part 95a refers to the angle information storage area 94a to determine the angle α formed by the first side surface C11 and the fourth side surface C14 at the completion of the initial action, which corresponds to the inputted information, but this embodiment is not provided by way of limitation. For example, the angle α, which is formed by the first side surface C11 and the fourth side surface C14 at the completion of the initial action and corresponds to the information pertaining to the length L2 of the fourth side surface C14 of the cardboard box sheet FB, may be inputted to the input/output part 93 by an operator or the like of the box-making and box-packing system 100.

The invention claimed is:

1. A box-opening device configured to unfold a folded cardboard box sheet in which a first side surface and a second side surface overlap with a third side surface and a fourth side surface and form a square-tube-shaped cardboard box in which the first side surface, the second side surface, the third side surface, and the fourth side surface are arranged in this order, the box-opening device comprising:
a first grasping part that grasps the first side surface;
a first arm that has a second grasping part that grasps the fourth side surface and changes a posture while the second grasping part grasps the fourth side surface;
a control part that controls a movement of the first arm so that an initial action, in which a gap is formed between the first and second side surfaces and the third and fourth side surfaces of the folded cardboard box sheet overlapping each other, and a main action, which is performed after the initial action and in which the cardboard box sheet is formed into a square tube shape, are executed as an action of unfolding the cardboard box sheet;
the first arm configured to move at or slower than a predetermined speed in the initial action, and the first arm configured to move faster than the predetermined speed in the main action; and
the control part controlling configured to control the movement of the first arm based on an angle formed by the first side surface and the fourth side surface, such that the initial action comes to an end when the angle reaches a target angle, the target angle being determined according to a length of a side of the cardboard box sheet.

2. The box-opening device according to claim 1, wherein the target angle is determined according to a length of the fourth side surface of the cardboard box sheet.

3. The box-opening device according to claim 2, wherein the target angle increases as the length of the fourth side surface increases.

4. The box-opening device according to claim 1, further comprising
a second arm that has a third grasping part that grasps the third side surface, the second arm configured to change posture while the third grasping part grasps the third side surface, and
the control part configured to control a movement of the second arm.

5. The box-opening device according to claim 4, wherein the second arm is linked to the first arm so as to be able to change posture relative to the first arm, and
during the main action, the control part moves the first arm while causing the second arm to change the posture relative to the first arm.

6. The box-opening device according to claim 5, wherein at a start of the initial action, the control part moves the first arm without causing the posture of the second arm to change relative to the first arm, and before the end of the initial action, the control part causes the first arm to stop and the posture of the second arm to change relative to the first arm.

7. The box-opening device according to claim 4, wherein at the end of the initial action, the control part controls the movement of the second arm so that the first side surface and the third side surface become parallel to each other and the second side surface and the fourth side surface become parallel to each other.

8. The box-opening device according to claim 4, wherein the second arm is driven by an air cylinder.

9. The box-opening device according to claim 1, wherein the first grasping part releases the grasping of the first side surface after a start of the main action and before the end of the main action.

* * * * *